US011247617B2

(12) United States Patent
Mizutani et al.

(10) Patent No.: US 11,247,617 B2
(45) Date of Patent: Feb. 15, 2022

(54) PASSENGER COMPARTMENT STRUCTURE

(71) Applicant: TOYOTA JIDOSHA KABUSHIKI KAISHA, Toyota (JP)

(72) Inventors: Atsushi Mizutani, Toyota (JP); Yuma Saiki, Toyota (JP); Momoko Azuma, Itabashi-ku (JP); Yusaku Morita, Miyoshi (JP); Kanako Naruse, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 16/183,901

(22) Filed: Nov. 8, 2018

(65) Prior Publication Data

US 2019/0202377 A1 Jul. 4, 2019

(30) Foreign Application Priority Data

Dec. 28, 2017 (JP) ............................ JP2017-253904

(51) Int. Cl.
*B60R 13/02* (2006.01)
*B62D 31/02* (2006.01)

(52) U.S. Cl.
CPC ........ *B60R 13/0275* (2013.01); *B62D 31/025* (2013.01)

(58) Field of Classification Search
CPC .. B60R 21/026; B60R 13/0275; B62D 31/025
USPC ........... 296/24.4, 24.41, 24.42, 24.43, 24.44, 296/24.45, 24.46
See application file for complete search history.

(56) References Cited

U.S. PATENT DOCUMENTS

| | | | | |
|---|---|---|---|---|
| 2010/0066114 | A1* | 3/2010 | Winget | B60R 21/026 296/24.43 |
| 2010/0201148 | A1* | 8/2010 | Storer | B60R 21/12 296/24.46 |
| 2014/0361585 | A1* | 12/2014 | Henshaw | B64D 11/0606 297/174 R |
| 2016/0297524 | A1* | 10/2016 | Simeon | B64D 11/0606 |
| 2016/0297530 | A1 | 10/2016 | Simeon et al. | |
| 2018/0105273 | A1* | 4/2018 | Robinson | B64D 11/0605 |

FOREIGN PATENT DOCUMENTS

| | | |
|---|---|---|
| CN | 2628333 Y | 7/2004 |
| CN | 106536352 A | 3/2017 |
| JP | 2011-136640 | 7/2011 |
| JP | 2017-523081 A | 8/2017 |

* cited by examiner

*Primary Examiner* — Joseph D. Pape
(74) *Attorney, Agent, or Firm* — Oblon, McClelland, Maier & Neustadt, L.L.P.

(57) ABSTRACT

A passenger compartment structure that includes: a passenger compartment that serves as an accommodation space for vehicle occupants; and a wall portion that is capable of selectively being put into a partitioned state and a connected state, the passenger compartment being partitioned into a plurality of individual spaces in the partitioned state, at least a neighboring pair of the individual spaces being connected with one another in the connected state, and in a case in which an operation to put neighboring individual spaces into the connected state is performed in each of the neighboring individual spaces, the wall portion putting the neighboring individual spaces in which the operation has been performed into the connected state.

10 Claims, 19 Drawing Sheets

12
10
14
14
14
14
UP
OUT
FR 10
12
14
16
18A(18)
18B(18)
18AC
20
20A
22
24
26
28
30
32
32A
32AA
32AB
34
36A(36)
36B(36)
48A(48)
48B(48)
FR
OUT 10
16
22
28
26
24
20A
18AC
36BC
36B(36)
36BB
18AD
OP1
20
OP2
18BB
48A(48)
48AB
18BC
18BA
48AC
34
32C
32
32B
32A
32AA
32AB
36A(36)
48B(48)
36AC
30
18B(18)
48BB
48BD
36AB
36AA
36AD
18AA
18A(18)
18AB
UP
OUT
FR 10
16
18AC
36BC
36B(36)
18AD
36BB
22
28
26
24
20A
OP1
OP2
20
48A(48)
48AB
18BC
18B
18BB
36A(36)
48B(48)
32AB
48AC
18BA
34
32C
32
32A
32AA
32B
18B(18)
18A(18)
18AA
18AB
UP
OUT
FR

UP
FR
OUT
70
30
18A(18)
72BD
72BB
74BB
72BC
74BC
72B
(72)
86
18AD
16
20
72AB
72BE
74B
(74)
18AB
71AA
71
71AB
71A
80
80
72A(72)
18AC
76
20
34
18AA
72AA
78

PASSENGER COMPARTMENT STRUCTURE

CROSS-REFERENCE TO RELATED APPLICATION

This application is based on and claims priority under 35 USC 119 from Japanese Patent Application No. 2017-253904 filed on Dec. 28, 2017, which is incorporated by reference herein.

BACKGROUND

Technical Field

The present disclosure relates to a passenger compartment structure.

Related Art

Japanese Patent Application Laid-Open (JP-A) No. 2011-136640 discloses an invention relating to a bus. This bus includes dividing walls provided between neighboring seats; a passenger compartment is partitioned by these dividing walls. The dividing walls are removable. Therefore, the passenger compartment may be partitioned at arbitrary locations.

Ride-sharing services utilizing passenger vehicles have started to become widespread in recent years. During ride-sharing, unacquainted people are riding in the same vehicle, which leads to problems in relation to privacy protection. Accordingly, providing dividing walls between seats as disclosed in JP-A No. 2011-136640 has been considered. However, because the dividing walls are removable, even when one vehicle occupant among the vehicle occupants sharing the ride wants a dividing wall provided, another vehicle occupant may remove the dividing wall. Therefore, privacy protection may not be sufficiently enabled. Thus, there is scope for improvement of the related art described above in this respect.

SUMMARY OF INVENTION

An aspect of the present disclosure is a passenger compartment structure that includes: a passenger compartment that serves as an accommodation space for vehicle occupants; and a wall portion that is capable of selectively being put into a partitioned state and a connected state, the passenger compartment being partitioned into a plurality of individual spaces in the partitioned state, at least a neighboring pair of the individual spaces being connected with one another in the connected state, and in a case in which an operation to put neighboring individual spaces into the connected state is performed in each of the neighboring individual spaces, the wall portion putting the neighboring individual spaces in which the operation has been performed into the connected state.

DESCRIPTION OF EMBODIMENTS

First Exemplary Embodiment

Figure 1:
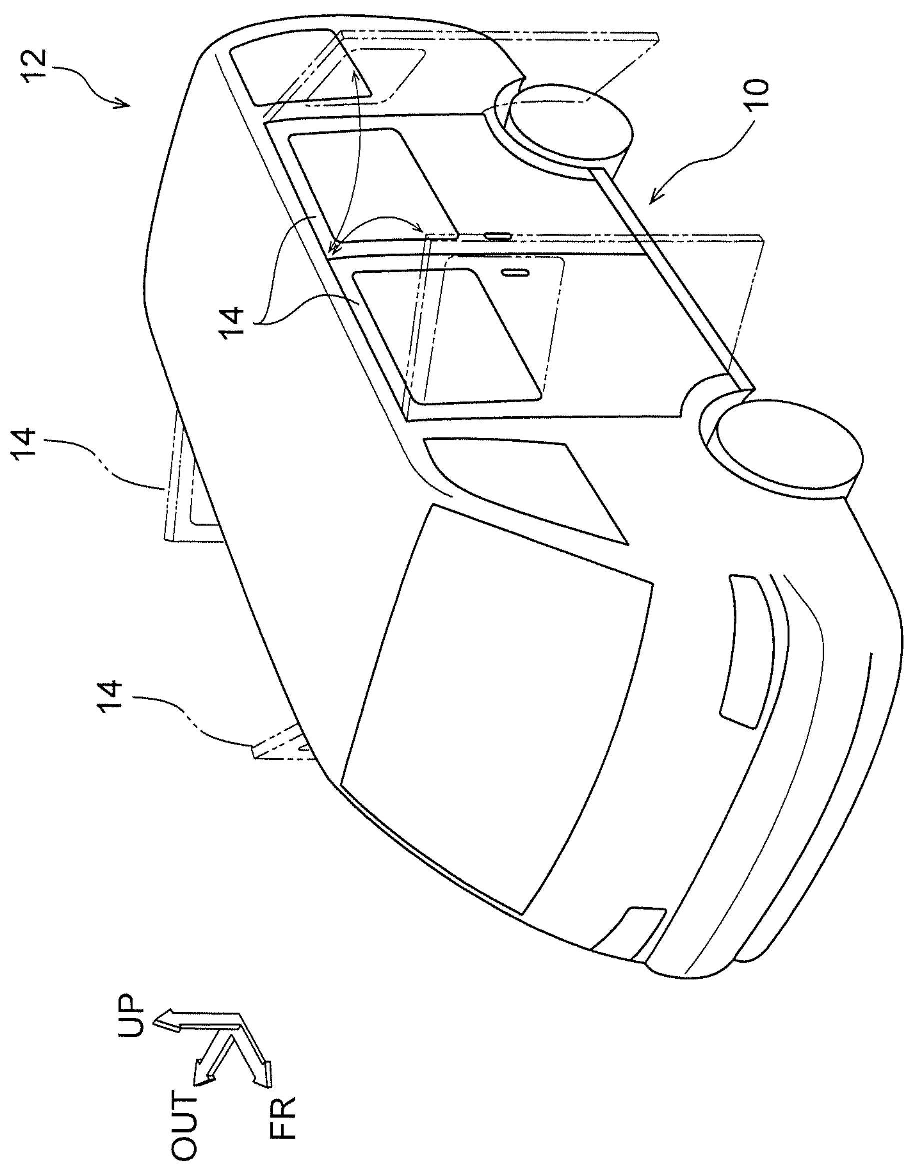
FIG. 1 is a schematic perspective view showing a vehicle with a passenger compartment structure according to a first exemplary embodiment.

Herebelow, a first exemplary embodiment of the passenger compartment structure according to the present invention is described using FIG. 1 to FIG. 15. The arrow FR shown in the drawings indicates a vehicle front-and-rear direction front side, the arrow OUT indicates a vehicle width direction outer side, and an arrow UP indicates a vehicle vertical direction upper side.

—Overall Structure—

As shown in FIG. 1, a vehicle 12 in which a passenger compartment structure 10 according to the present exemplary embodiment is employed is, for example, a one-box-type automobile. Side doors 14 are provided in both of side portions of the vehicle 12. Each side door 14 has a double-door structure, being openable and closeable about hinges that are provided at the vehicle front side and the vehicle rear side of a door aperture portion (see the two-dot chain lines in FIG. 1). The vehicle 12 is, as an example, a self-driving vehicle with a structure in which no driver seat and front passenger seat are provided.

—Passenger Compartment—

Figure 2:
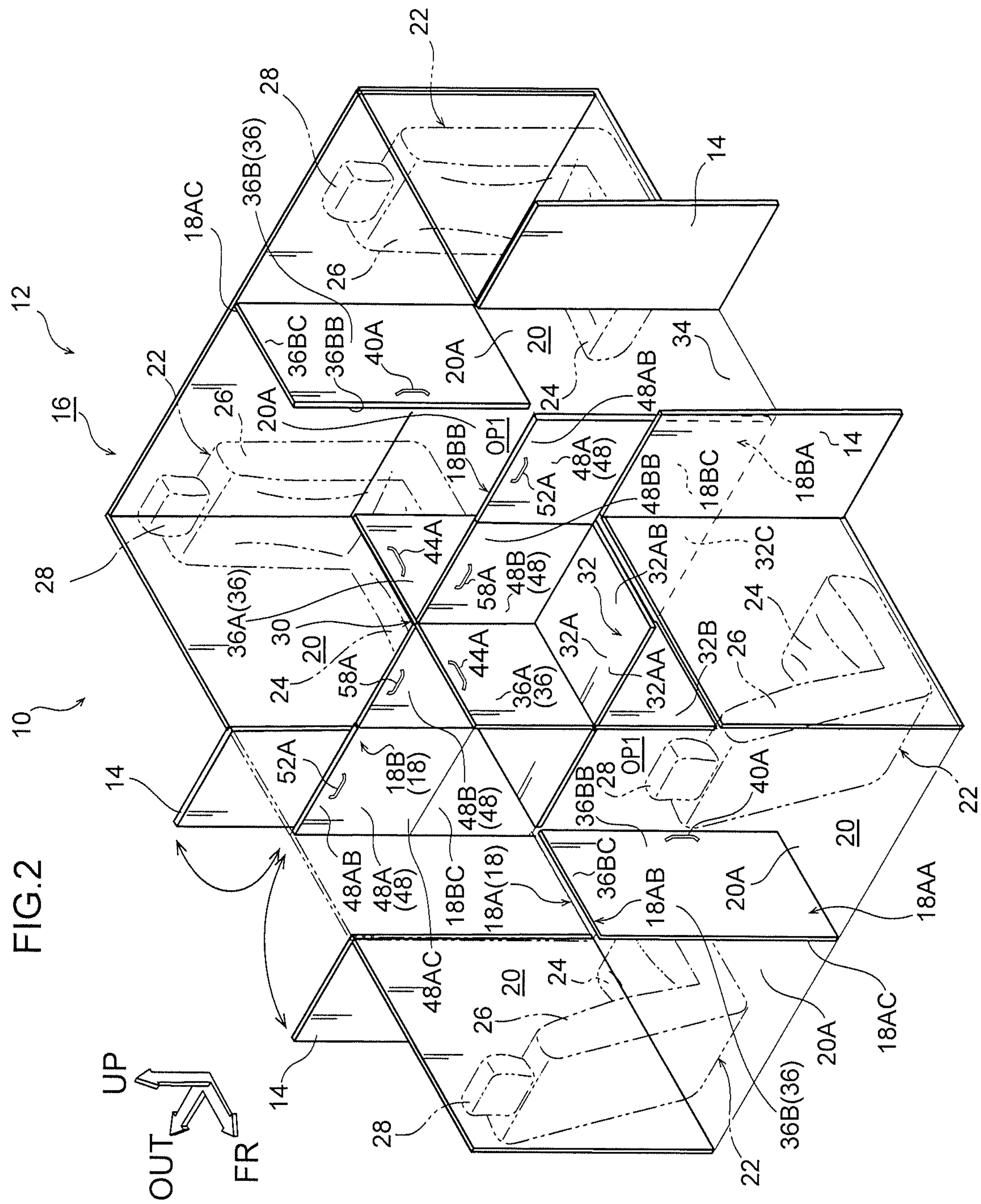
FIG. 2 is a schematic perspective view showing a passenger compartment of the vehicle with the passenger compartment structure according to the first exemplary embodiment.

As shown in FIG. 2, a passenger compartment 16 in which vehicle occupants sit is provided in a cabin of the vehicle 12. The passenger compartment 16 occupies the greater part of the cabin. Movement is possible from the outside into the passenger compartment 16 and from the passenger compartment 16 to the outside through the apertures of the side doors 14. A luggage loading space (trunk compartment) is provided in the cabin at the vehicle rear side of the passenger compartment 16.

A plural number (four in the present exemplary embodiment) of individual spaces 20 are provided in the passenger compartment 16. The individual spaces 20 are partitioned by wall portions 18, which are described below. One vehicle seat 22 is provided in each of the individual spaces 20. Each vehicle seat 22 is structured by a seat cushion 24, a seat back 26 and a headrest 28. The seat cushion 24 supports the pelvis area and thigh area of a vehicle occupant, the seat back 26 supports the back area of the vehicle occupant, and the headrest 28 supports the head area of the vehicle occupant. The vehicle seats 22 in the individual spaces 20 at the vehicle front side of the passenger compartment 16 are mounted such that vehicle occupants sit facing to the vehicle rear side. The vehicle seats 22 in the individual spaces 20 at the vehicle rear side of the passenger compartment 16 are mounted such that vehicle occupants sit facing to the vehicle front side. That is, the vehicle seats 22 in the individual spaces 20 at the vehicle front side and the vehicle seats 22 in the individual spaces 20 at the vehicle rear side are arranged so as to face one another. Each vehicle seat 22 may be made movable within the individual space 20 along a sliding rail, and may be made turnable in a horizontal direction by a turning mechanism.

A luggage space 20A is provided between each vehicle seat 22 and a first wall portion 18A of the wall portions 18, which is described below. The luggage space 20A is specified with a size in which, for example, a single standard suitcase can be placed. That is, each individual space 20 is large enough for one vehicle occupant with luggage to ride in. Note that the individual spaces 20 are not limited to a size in which one vehicle occupant with luggage can ride but may have sizes in which two or more vehicle occupants can ride.

—Wall Portions—

The wall portions 18 are provided inside the passenger compartment 16. The wall portions 18 include the first wall portion 18A and a second wall portion 18B. The first wall portion 18A extends in the vehicle front-and-rear direction substantially at the middle of the passenger compartment 16 in the vehicle width direction. The second wall portion 18B extends in the vehicle width direction substantially at the middle of the passenger compartment 16 in the vehicle front-and-rear direction. A table 32, which is described below, is provided at a substantially central portion of the passenger compartment 16, that is, at an intersection portion 30 between the first wall portion 18A and the second wall portion 18B (see FIG. 3).

—First Wall Portion—

A lower end portion 18AA of the first wall portion 18A substantially abuts against a floor 34 of the passenger compartment 16 (excluding a first table movable wall 36A that is described below). An upper end portion 18AB of the first wall portion 18A substantially abuts against a roof lining, which is an interior decor, member that serves as a ceiling of the passenger compartment 16.

—Movable Walls of the First Wall Portion—

Movable walls 36 are provided at the first wall portion 18A. Each movable wall 36 includes a plural number (two in the present exemplary embodiment) of a horizontally movable wall 36B, which are provided to be spaced apart in the vehicle front-and-rear direction, and a plural number (two in the present exemplary embodiment) of the first table movable wall 36A, which are provided to be arrayed in the vehicle front-and-rear direction. Each horizontally movable wall 36B is provided between a fixed wall portion 18AC of the first wall portion 18A (see FIG. 4) and the table 32. The horizontally movable wall 36B is formed of a board with a board thickness direction in the vehicle width direction. Similarly to the horizontally movable wall 36B, the fixed wall portion 18AC is formed of a board with a board thickness direction in the vehicle width direction. The fixed wall portion 18AC is fixed to the floor 34 via a fixture at a position of the first wall portion 18A that corresponds with the vehicle seat 22 (at the vehicle width direction inner side relative to the vehicle seat 22).

Figure 4:
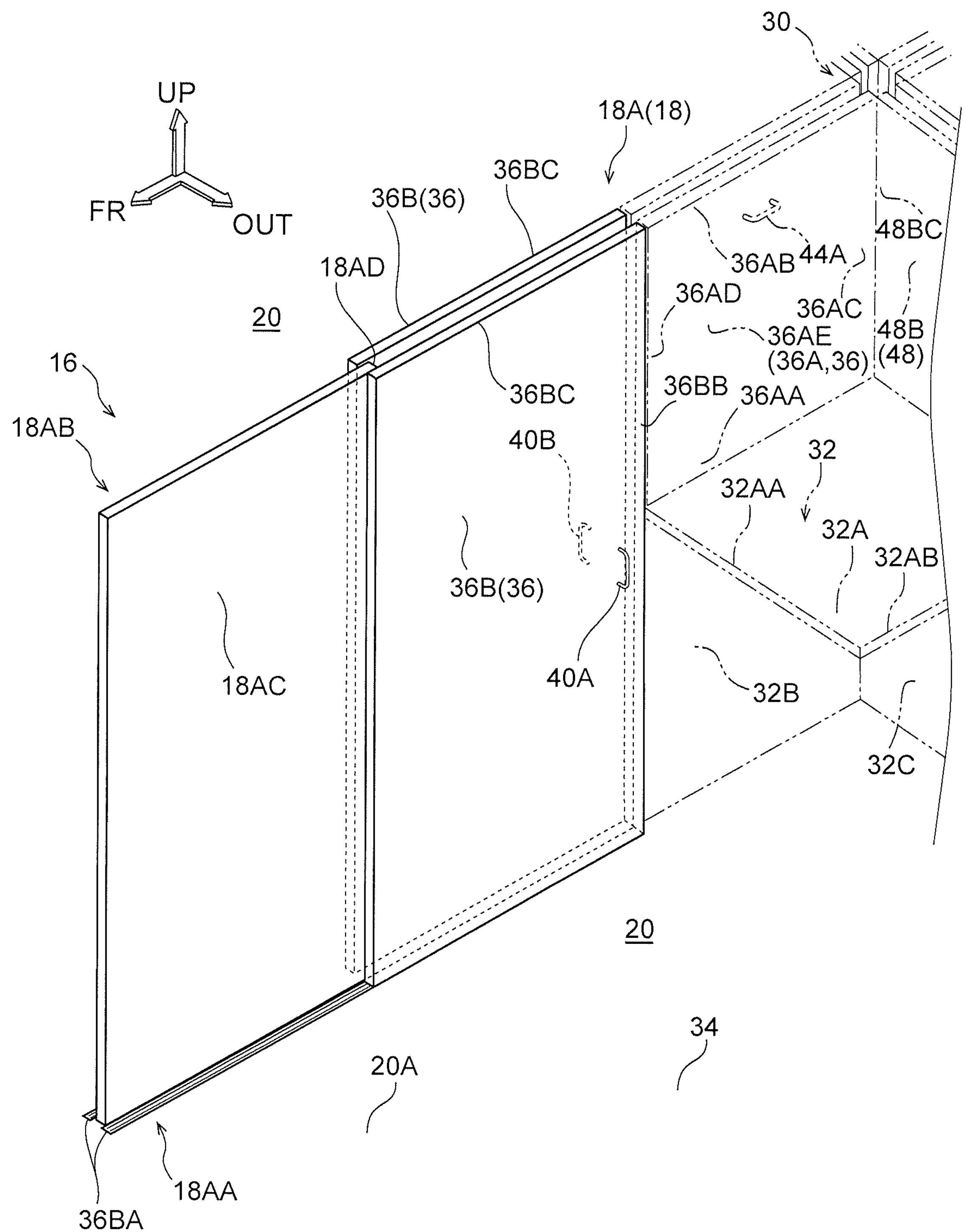
FIG. 4 is a schematic perspective view showing a partitioned state of horizontally movable walls of the passenger compartment structure according to the first exemplary embodiment.

As shown in FIG. 4, the horizontally movable walls 36B are provided as an opposing pair sandwiching the fixed wall portion 18AC. Each of the horizontally movable walls 36B is specified with a size substantially the same as the fixed wall portion 18AC, and is movable along a rail 36BA that extends in a horizontal direction, specifically the vehicle front-and-rear direction.

Figure 5:
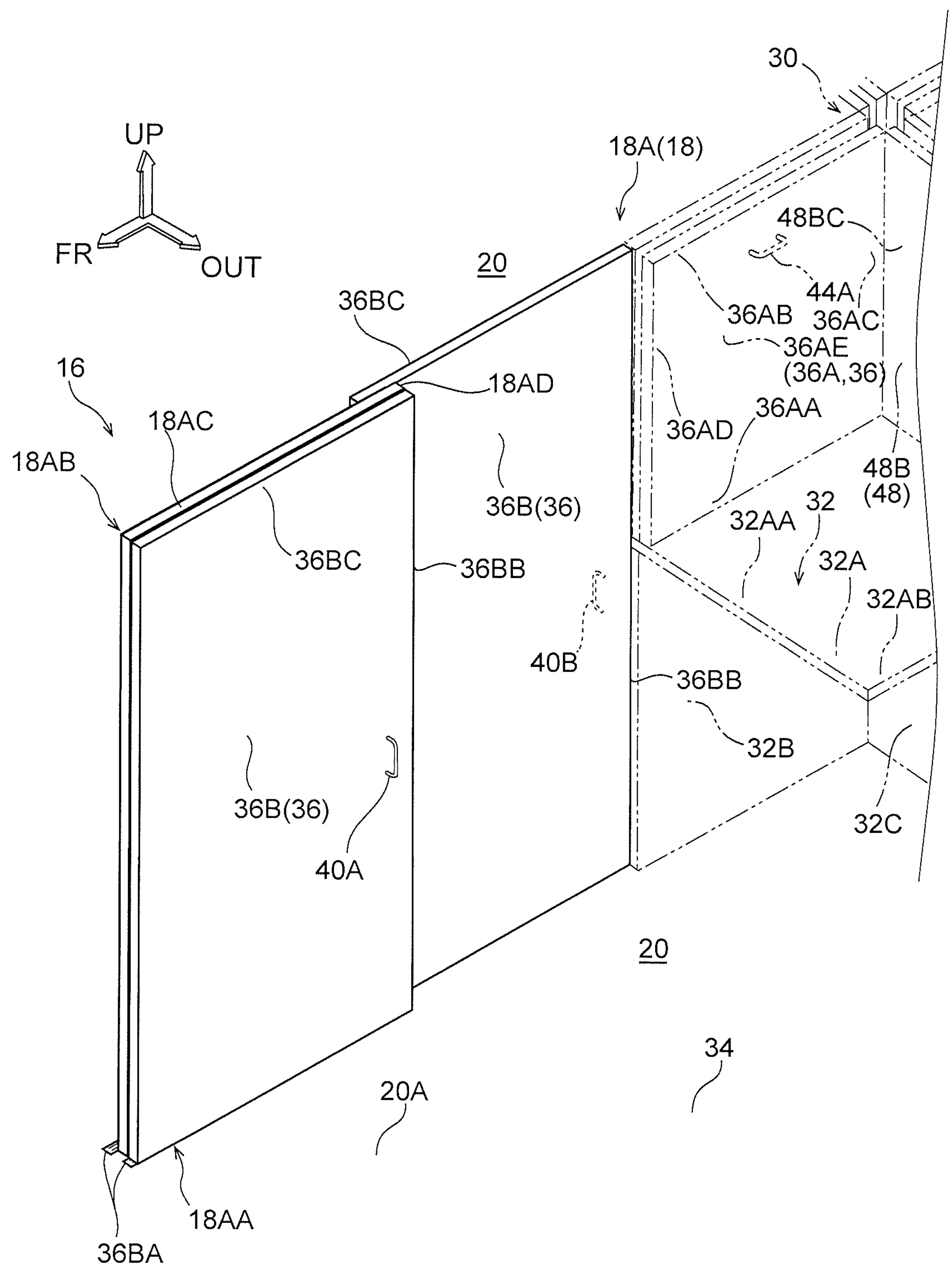
FIG. 5 is a schematic perspective view showing a state in which one of the opposing horizontally movable walls is put into an open state from the state shown in FIG. 4.

Handle members 40A and 40B are attached to the horizontally movable walls 36B, substantially in the middle in the vehicle vertical direction of faces of the horizontally movable walls 36B that face the individual spaces 20 in an opposing state (overlapping state) of the horizontally movable walls 36B. The handle members 40A and 40B are attached to the sides of the horizontally movable walls 36B at which the table 32 is disposed. Each handle member 40A or 40B protrudes to a vehicle width direction outer side from the corresponding horizontally movable wall 36B (the side thereof at which the individual space 20 is disposed), and is formed of a tubular member that is formed in a substantial "U" shape in a vehicle front view. The handle member 40A or 40B is, for example, equipped with a locking mechanism. When the handle member 40A or 40B is gripped, locking of the locking mechanism is unlocked and the horizontally movable wall 36B may be moved in the vehicle front-and-rear direction. Thus, as shown in FIG. 5, a vehicle occupant riding in one of the individual spaces 20 may grip the handle member 40A of the horizontally movable wall 36B at the side opposing the individual space 20 in which this vehicle occupant is riding and move this horizontally movable wall 36B toward the vehicle front side. A position in which an end portion 36BB at the side of the horizontally movable wall 36B that opposes the table 32 substantially matches an end portion 18AD at the side of the fixed wall portion 18AC that opposes the table 32 corresponds to an "open state" of the horizontally movable wall 36B. However, this vehicle occupant cannot grip the handle member 40B of the other horizontally movable wall 36B opposing the horizontally movable wall 36B to which the handle member 40A is attached. Therefore, this vehicle occupant cannot move the other horizontally movable wall 36B.

Figure 10:
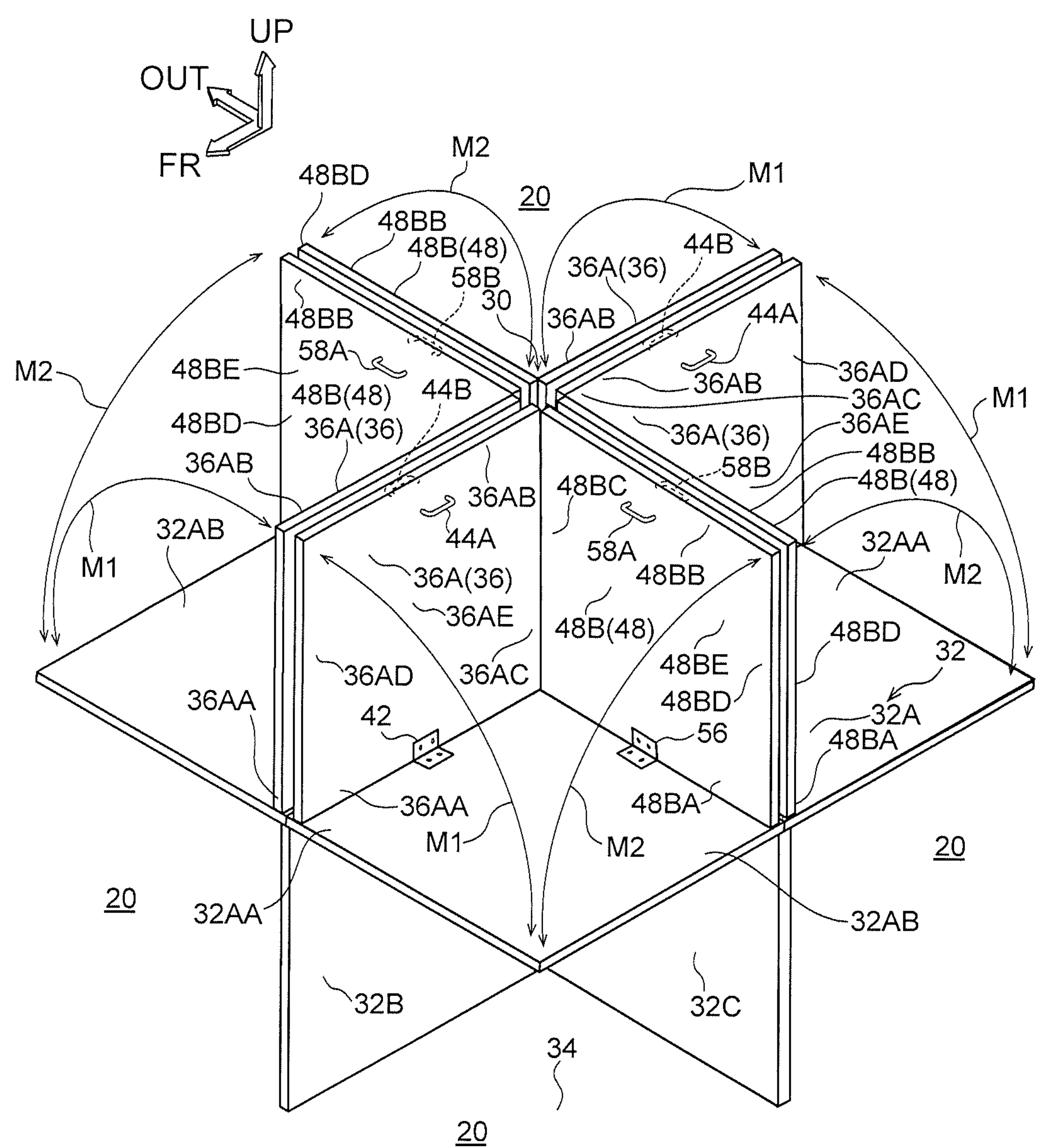
FIG. 10 is a schematic perspective view showing a table in the passenger compartment structure according to the first exemplary embodiment.

As shown in FIG. 10, each first table movable wall 36A is formed of a board member with a board thickness direction in the vehicle width direction. The first table movable walls 36A are provided as a pair that oppose one another in the vehicle width direction above a top board 32A of the table 32. More specifically, a lower end portion 36AA of each first table movable wall 36A opposes an upper face of the top board 32A of the table 32, and an upper end portion 36AB of the first table movable wall 36A is at substantially the same position as an upper end portion 36BC of the horizontally movable wall 36B (see FIG. 4). An end portion 36AC at one side in the vehicle front-and-rear direction of the first table movable wall 36A is disposed substantially at the center in the vehicle front-and-rear direction of the table 32, and another end portion 36AD of the first table movable wall 36A in the vehicle front-and-rear direction is disposed to correspond with an end portion 32AA of the table 32 in the vehicle front-and-rear direction.

At each first table movable wall 36A, a first hinge 42 with an axial direction in the vehicle front-and-rear direction is attached to a side face 36AE at the vehicle width direction outer side of the first table movable wall 36A (a face at the side of the first table movable wall 36A that opposes the individual space 20 in the state in which the first table movable walls 36A are opposed), at the side of the first table movable wall 36A at which the lower end portion 36AA is disposed. The first table movable wall 36A is attached to the top board 32A of the table 32 via the first hinge 42. Consequently, each first table movable wall 36A may be tilted about the axial direction in the vehicle front-and-rear direction over the top board 32A from an upright state toward the vehicle width direction outer side (see arrow M1 in FIG. 10). This tilted state corresponds to an open state (see FIG. 12). Tilting of the first table movable wall 36A toward the side thereof at which the opposing other first table movable wall 36A is disposed is restricted by a stopper.

Figure 12:
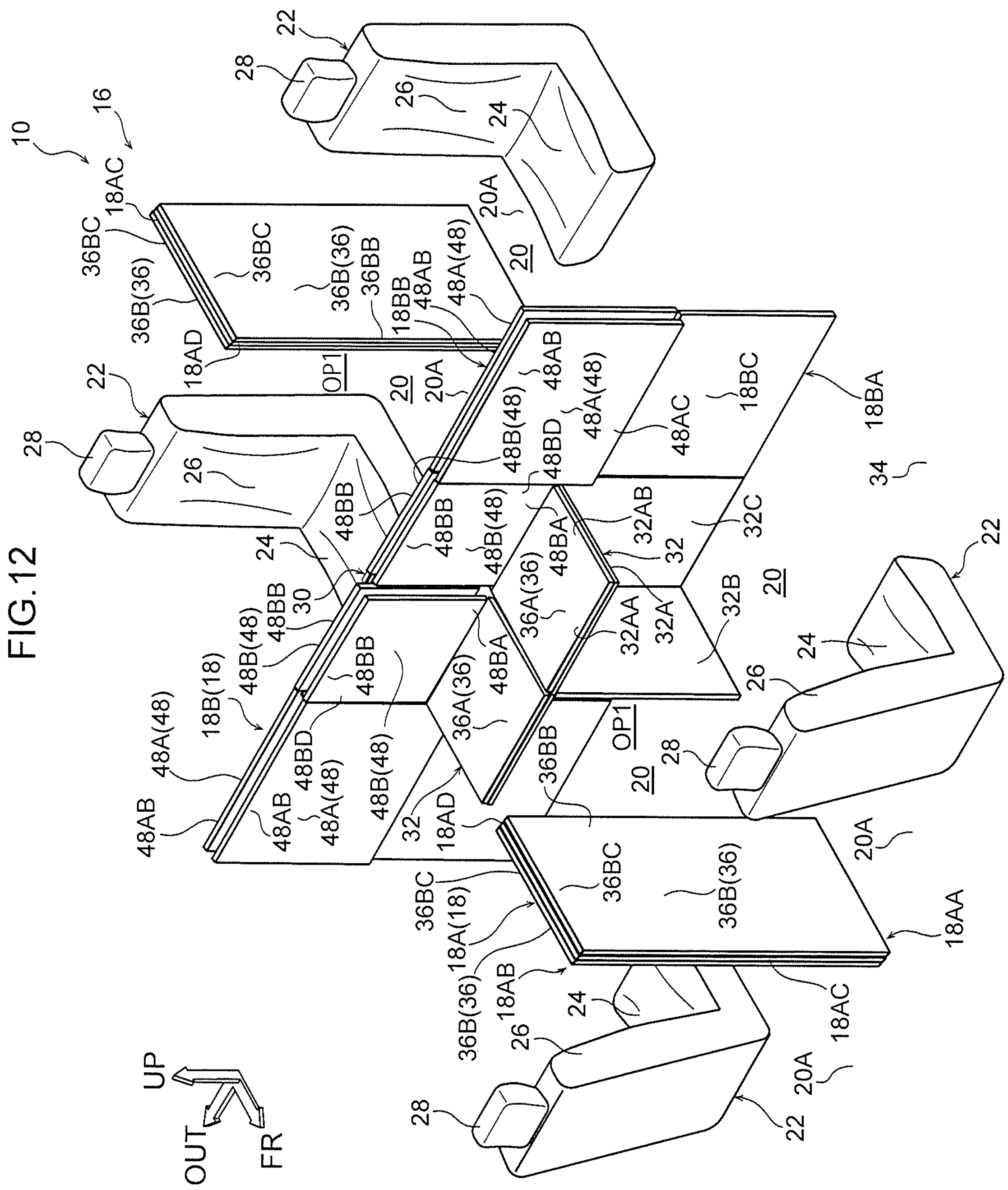
FIG. 12 is a schematic perspective view showing a state of the passenger compartment structure according to the first exemplary embodiment in which wall portions that divide the passenger compartment in a vehicle width direction are in the connected state.

A handle member 44A or 44B is attached to each first table movable wall 36A, substantially in the middle of the side face 36AE in the vehicle front-and-rear direction, at the side thereof at which the upper end portion 36AB is disposed. Each handle member 44A or 44B protrudes to the vehicle width direction outer side from the first table movable wall 36A, and is formed of a tubular member that is formed in a substantial "U" shape in a vehicle plan view. The handle member 44A or 44B is, for example, equipped with a locking mechanism. The handle member 44A or 44B may be gripped, locking of the locking mechanism may be unlocked, and the first table movable wall 36A may be tilted about the axial direction in the vehicle front-and-rear direction as shown in FIG. 12.

—Second Wall Portion—

As shown in FIG. 2, a lower end portion 18BA of each second wall portion 18B substantially abuts against the floor 34 of the passenger compartment 16 (excluding a second table movable wall 48B that is described below). An upper end portion 18BB of the second wall portion 18B substantially abuts against the roof lining of the passenger compartment 16 when the movable wall 48, which is described below, is in an open state.

—Movable Walls of the Second Wall Portion—

The movable wall 48 is provided at the second wall portion 18B. The movable wall 48 includes a plural number (two in the present exemplary embodiment) of a vertically movable wall 48A, which are provided to be spaced apart in the vehicle width direction, and a plural number (two in the present exemplary embodiment) of the second table movable wall 48B, which are provided to be arrayed in the vehicle width direction. Each vertically movable wall 48A is provided between the side doors 14 in a closed state thereof and the table 32 (see FIG. 3). The vertically movable wall 48A is formed of a board with a board thickness direction in the vehicle front-and-rear direction.

Figure 7:
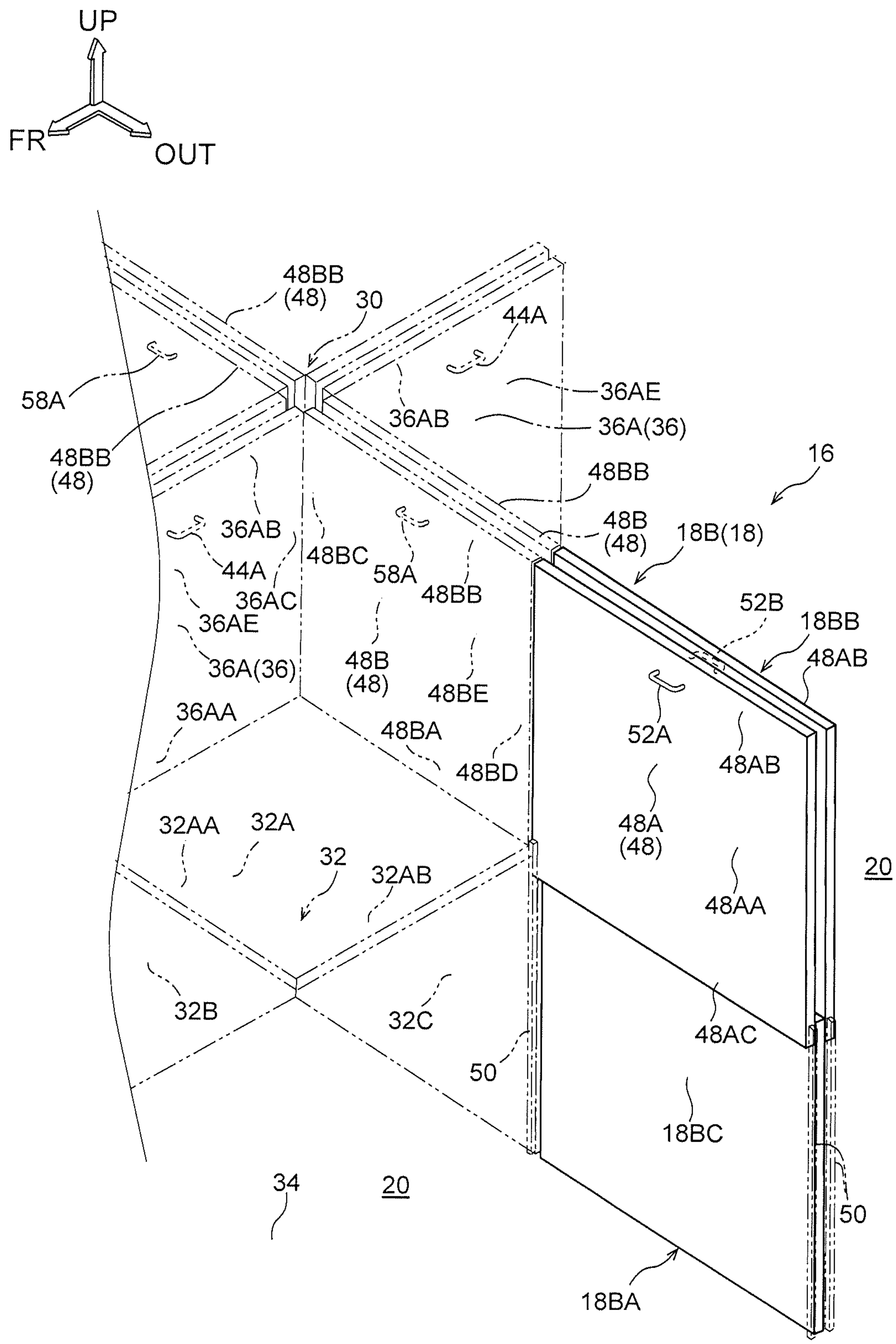
FIG. 7 is a schematic perspective view showing a partitioned state of vertically movable walls of the passenger compartment structure according to the first exemplary embodiment.

As shown in FIG. 7, the vertically movable walls 48A are provided as opposing pairs sandwiching fixed wall portions 18BC. Similarly to the vertically movable walls 48A, each fixed wall portion 18BC is formed of a board with a board thickness direction in the vehicle front-and-rear direction. As shown in FIG. 7, an end portion at the vehicle width direction inner side of the fixed wall portion 18BC is disposed in a vicinity of a vehicle width direction end portion 32AB of the table 32, and an end portion at the vehicle width direction outer side of the fixed wall portion 18BC is disposed in the vicinity of the side doors 14 in the closed state thereof (see FIG. 3). Each vertically movable wall 48A is fixed to the floor 34 via a fixture at a position of the second wall portion 18B that corresponds with the vehicle seat 22 (at the vehicle front-and-rear direction inner side relative to the vehicle seat 22).

As shown in FIG. 7, each of the vertically movable walls 48A is specified with a size substantially the same as the fixed wall portion 18BC, and is movable along a pair of rails 50 that extend in a vertical direction, specifically the vehicle vertical direction.

Figure 8:
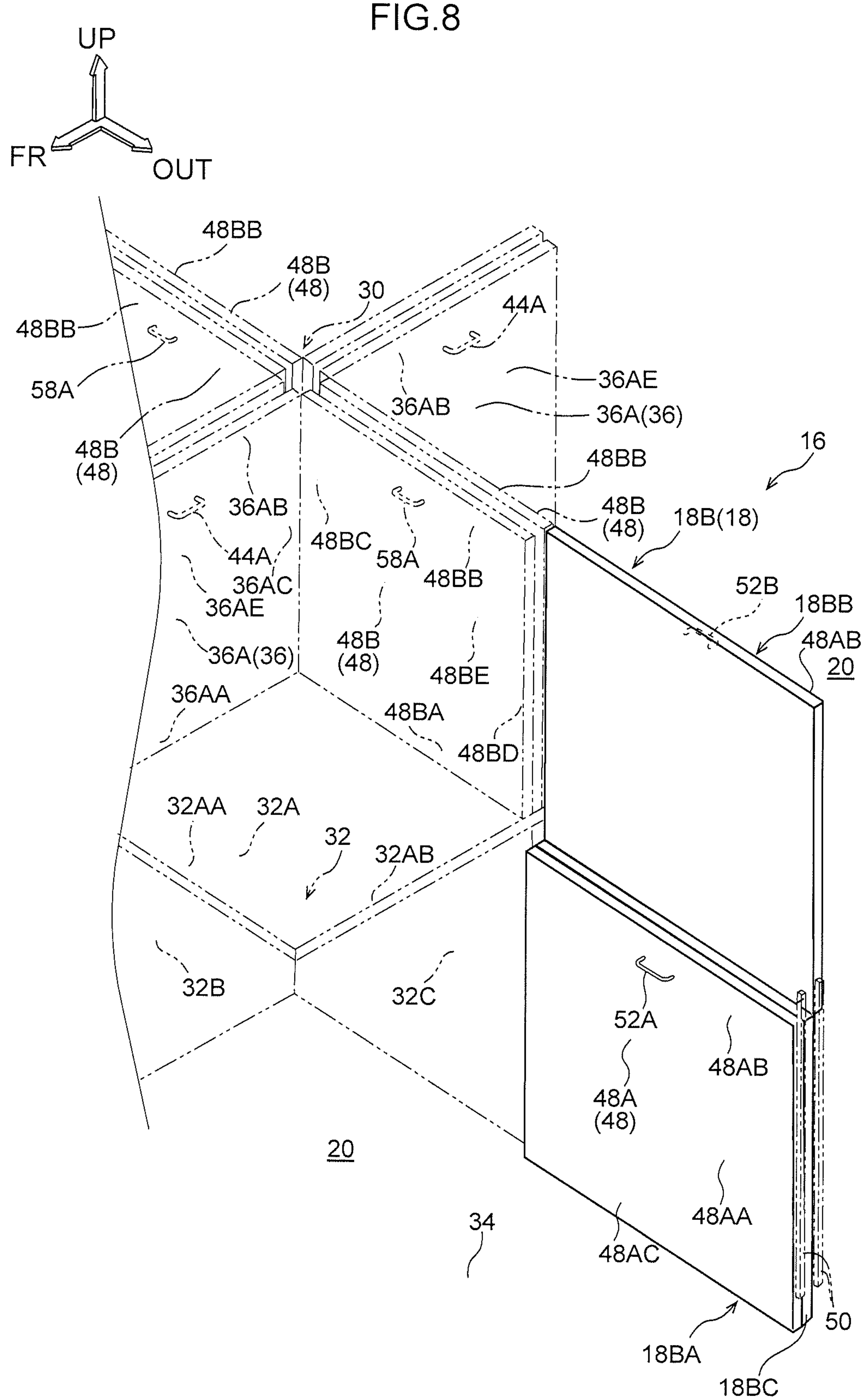
FIG. 8 is a schematic perspective view showing a state in which one of the opposing vertically movable walls is put into an open state from the state shown in FIG. 7.

Handle members 52A and 52B are attached to the vertically movable walls 48A, substantially in the middle of side faces 48AA of the vertically movable walls 48A that face the individual spaces 20 in an opposing state (overlapping state) of the vertically movable walls 48A. The handle members 52A and 52B are attached at sides of the vertically movable walls 48 at which upper end portions 48AB are disposed. Each handle member 52A or 52B protrudes to a vehicle front-and-rear direction outer side from the corresponding vertically movable wall 48A, and is formed of a tubular member that is formed in a substantial "U" shape in a vehicle plan view. The handle member 52A or 52B is, for example, equipped with a locking mechanism. When the handle member 52A or 52B is gripped, locking of the locking mechanism is unlocked and the vertically movable wall 48A may be moved in the vehicle vertical direction. Thus, as shown in FIG. 8, a vehicle occupant may grip the handle member 52A of the vertically movable wall 48A at the side opposing the individual space 20 in which this vehicle occupant is riding and move this vertically movable wall 48A toward the vehicle lower side. A state in which a lower end portion 48AC of the vertically movable wall 48A substantially abuts against the floor 34 corresponds to an "open state". However, this vehicle occupant cannot grip the handle member 52B of the other vertically movable wall 48A opposing the vertically movable wall 48A to which the handle member 52A is attached. Therefore, this vehicle occupant cannot move the other vertically movable wall 48A. Note that the upper end portion 48AB of each vertically movable wall 48A constitutes a portion of the upper end portion 18BB of the second wall portion 18B; the upper end portion 48AB in a closed state of the vertically movable wall 48A substantially abuts against the roof lining of the passenger compartment 16.

As shown in FIG. 10, each second table movable wall 48B is formed of a board member with a board thickness direction in the vehicle front-and-rear direction. The second table movable walls 48B are provided as a pair that oppose one another in the vehicle front-and-rear direction above the top board 32A of the table 32. More specifically, a lower end portion 48BA of each second table movable wall 48B opposes the upper face of the top board 32A of the table 32, and an upper end portion 48BB of the second table movable wall 48B is at substantially the same position as the upper end portion 48AB of the vertically movable wall 48A in the closed state thereof (see FIG. 7). An end portion 48BC at one side in the vehicle width direction of the second table movable wall 48B is disposed substantially at the center in the vehicle width direction of the table 32, and another end portion 48BD of the second table movable wall 48B in the vehicle width direction is disposed to correspond with the end portion 32AB of the table 32 in the vehicle width direction.

At each second table movable wall 48B, a second hinge 56 with an axial direction in the vehicle width direction is attached to a side face 48BE at the vehicle front-and-rear direction outer side of the second table movable wall 48B (a face at the side of the second table movable wall 48B that opposes the individual space 20 in the state in which the second table movable walls 48B are opposed), at the side of the second table movable wall 48B at which the lower end portion 48BA is disposed. The second table movable wall 48B is attached to the top board 32A of the table 32 via the second hinge 56. Consequently, each second table movable wall 48B may be tilted about the axial direction in the vehicle width direction over the top board 32A from an upright state toward the vehicle front-and-rear direction outer side (see arrow M2 in FIG. 10). This tilted state corresponds to an open state. Tilting of the second table movable wall 48B toward the side thereof at which the opposing other second table movable wall 48B is disposed is restricted by a stopper. In the upright state of the second table movable wall 48B, the end portion 48BC at the one side in the vehicle width direction abuts against the end portion 36AC of the first table movable wall 36A.

A handle member 58A or 58B is attached to each second table movable wall 48B, substantially in the middle of the side face 48BE in the vehicle width direction, at the side thereof at which the upper end portion 48BB is disposed. Each handle member 58A or 58B protrudes to the vehicle front-and-rear direction outer side from the second table movable wall 48B, and is formed of a tubular member that is formed in a substantial "U" shape in vehicle plan view. The handle member 58A or 58B is, for example, equipped with a locking mechanism. The handle member 58A or 58B may be gripped, locking of the locking mechanism may be unlocked, and the second table movable wall 48B may be tilted about the axial direction in the vehicle width direction (see FIG. 13).

Figure 15:
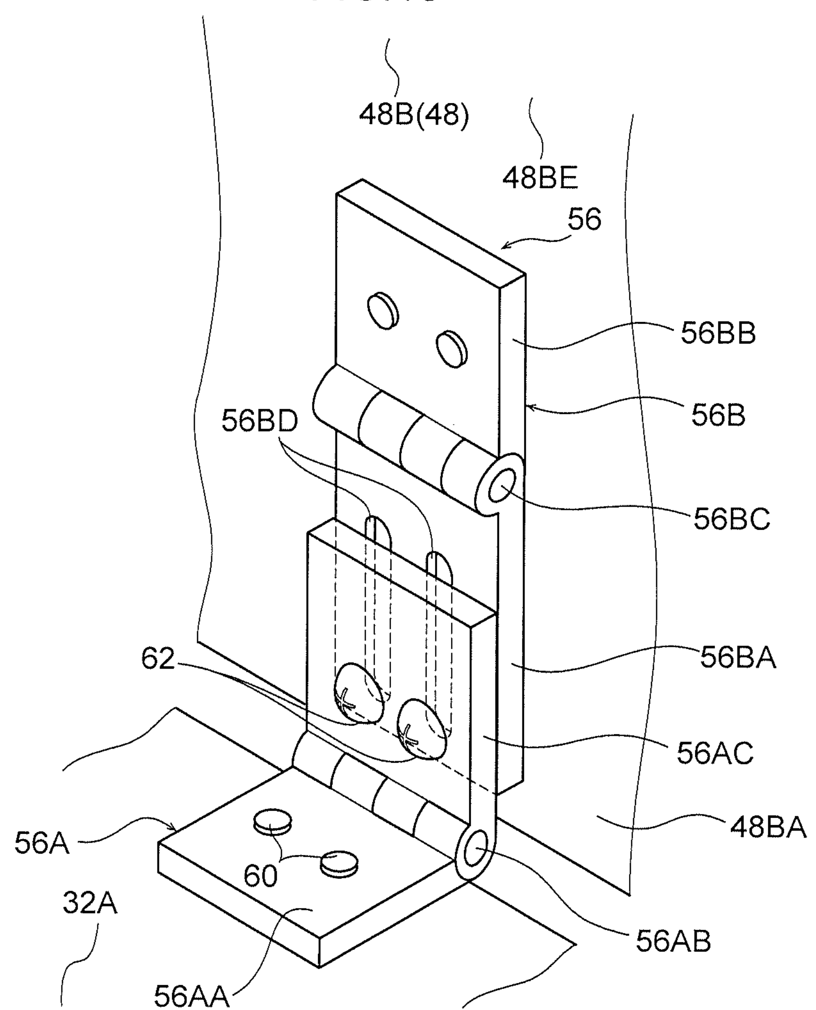
FIG. 15 is a schematic perspective view showing a second hinge of the table of the passenger compartment structure according to the first exemplary embodiment.

As shown in FIG. 15, the second hinge 56 includes a table side hinge member 56A and a movable wall side hinge member 56B. The table side hinge member 56A includes a table attachment portion 56AA, a table side hinge pin 56AB, and an intermediate portion 56AC. The table attachment portion 56AA and intermediate portion 56AC are turnably linked via the table side hinge pin 56AB, whose axial direction is in the vehicle width direction. The table attachment portion 56AA is a plate-shaped member whose plate thickness direction is in the vehicle vertical direction. The table attachment portion 56AA is attached to the top face of the top board 32A of the table 32 via fasteners 60 inserted into penetrating holes that penetrate through the table attachment portion 56AA in the plate thickness direction thereof.

The intermediate portion 56AC is a plate-shaped member. The intermediate portion 56AC is fastened to an intermediate portion 56BA of the movable wall side hinge member 56B, which is described below, via plural fasteners 62 inserted into plural penetrating holes that penetrate through the intermediate portion 56AC in the plate thickness direction thereof.

The movable wall side hinge member 56B includes a movable wall attachment portion 56BB, a movable wall side hinge pin 56BC, and the intermediate portion 56BA. The movable wall attachment portion 56BB and intermediate portion 56BA are turnably linked via the movable wall side hinge pin 56BC, whose axial direction is in the vehicle width direction. The movable wall attachment portion 56BB is a plate-shaped member. The movable wall attachment portion 56BB is attached to the side face 48BE of the second table movable wall 48B via others of the fasteners 60 inserted into penetrating holes that penetrate through the movable wall attachment portion 56BB in the plate thickness direction thereof.

Figure 13:
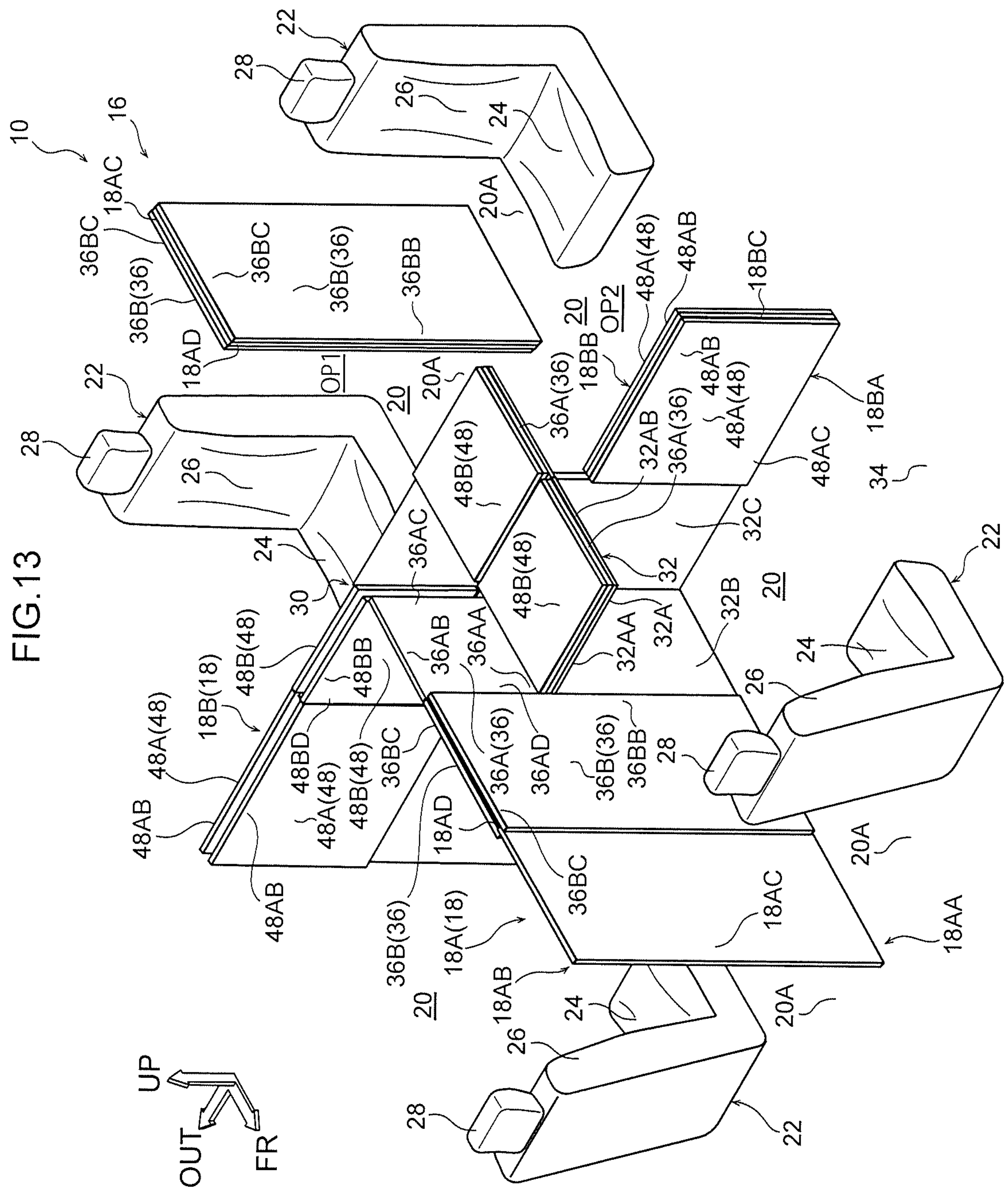
FIG. 13 is a schematic perspective view showing a state of the passenger compartment structure according to the first exemplary embodiment in which a wall portion that divides the passenger compartment in the vehicle width direction and one of wall portions that divide the passenger compartment in a vehicle front-and-rear direction are in the connected state.

The intermediate portion 56BA is a plate-shaped member. A plural number (two in the present exemplary embodiment) of long penetrating holes 56BD are formed in the intermediate portion 56BA. The long penetrating holes 56BD penetrate through the intermediate portion 56BA in the plate thickness direction thereof and a length direction of the long penetrating holes 56BD is in the vehicle vertical direction. The fasteners 62 that penetrate through the intermediate portion 56AC of the table side hinge member 56A are inserted into the long penetrating holes 56BD and fastened. As a result, the intermediate portion 56BA, and hence the movable wall side hinge member 56B, is relatively movable in the length direction of the long penetrating holes 56BD with respect to the table side hinge member 56A. The table side hinge pin 56AB and movable wall side hinge pin 56BC may be adjusted by this relative movement so as to be separated by at least a plate thickness dimension of the first table movable wall 36A (see FIG. 10). According to this structure, the second table movable wall 48B is tiltable about one or both of the table side hinge pin 56AB and the movable wall side hinge pin 56BC relative to the top board 32A of the table 32. Therefore, as shown in FIG. 13, even in a state in which the first table movable wall 36A has already been tilted onto the top board 32A, the second table movable wall 48B may be tilted so as to lay on the first table movable wall 36A.

—Table—

Figure 3:
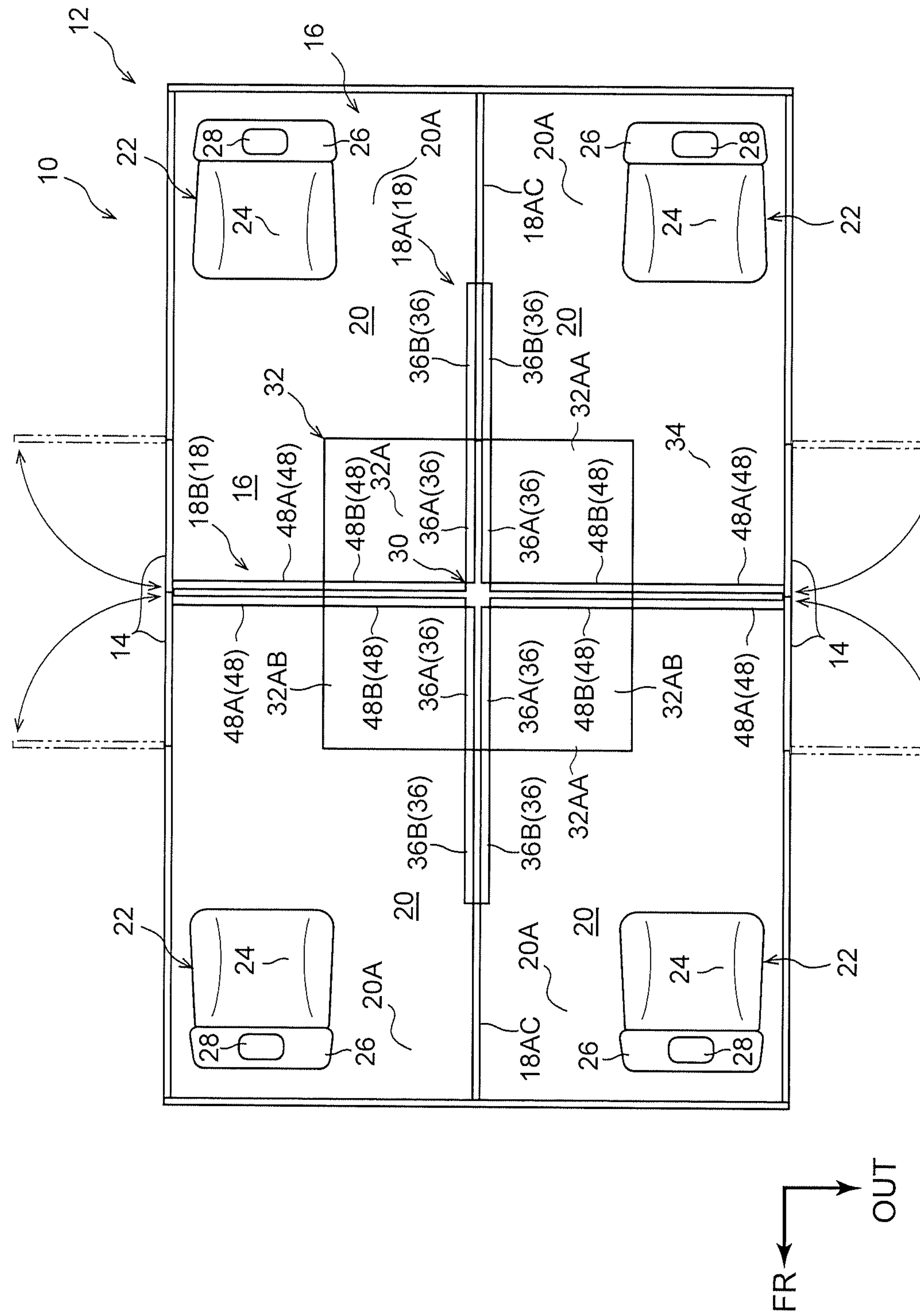
FIG. 3 is a plan view showing the passenger compartment of the vehicle with the passenger compartment structure according to the first exemplary embodiment.

As shown in FIG. 3, the table 32 is provided substantially centrally in the passenger compartment 16 in both the vehicle front-and-rear direction and the vehicle width direction. That is, as mentioned above, the table 32 is provided at the intersection portion 30 of the first wall portion 18A and the second wall portion 18B. As shown in FIG. 10, the table 32 includes the top board 32A, a first support wall portion 32B and a second support wall portion 32C. The top board 32A is formed of a board-shaped member that is substantially rectangular in vehicle plan view (see FIG. 3).

The first support wall portion 32B is continuous with the first table movable wall 36A in the vehicle vertical direction when the first table movable wall 36A is in the closed state thereof. The first support wall portion 32B extends in the vehicle front-and-rear direction. The second support wall portion 32C is continuous with the second table movable wall 48B in the vehicle vertical direction when the second table movable wall 48B is in the closed state thereof. The second support wall portion 32C extends in the vehicle width direction. The first support wall portion 32B and second support wall portion 32C are specified with heights that are substantially half the height of the fixed wall portion 18AC (see FIG. 4 and FIG. 7). The first support wall portion 32B and second support wall portion 32C support the top board 32A from the vehicle lower side thereof. The first support wall portion 32B and second support wall portion 32C are fixed to the floor 34 via respective fasteners. Thus, the table 32 is fixed to the floor 34, and hence to the vehicle body.

—Connected State—

Figure 6:
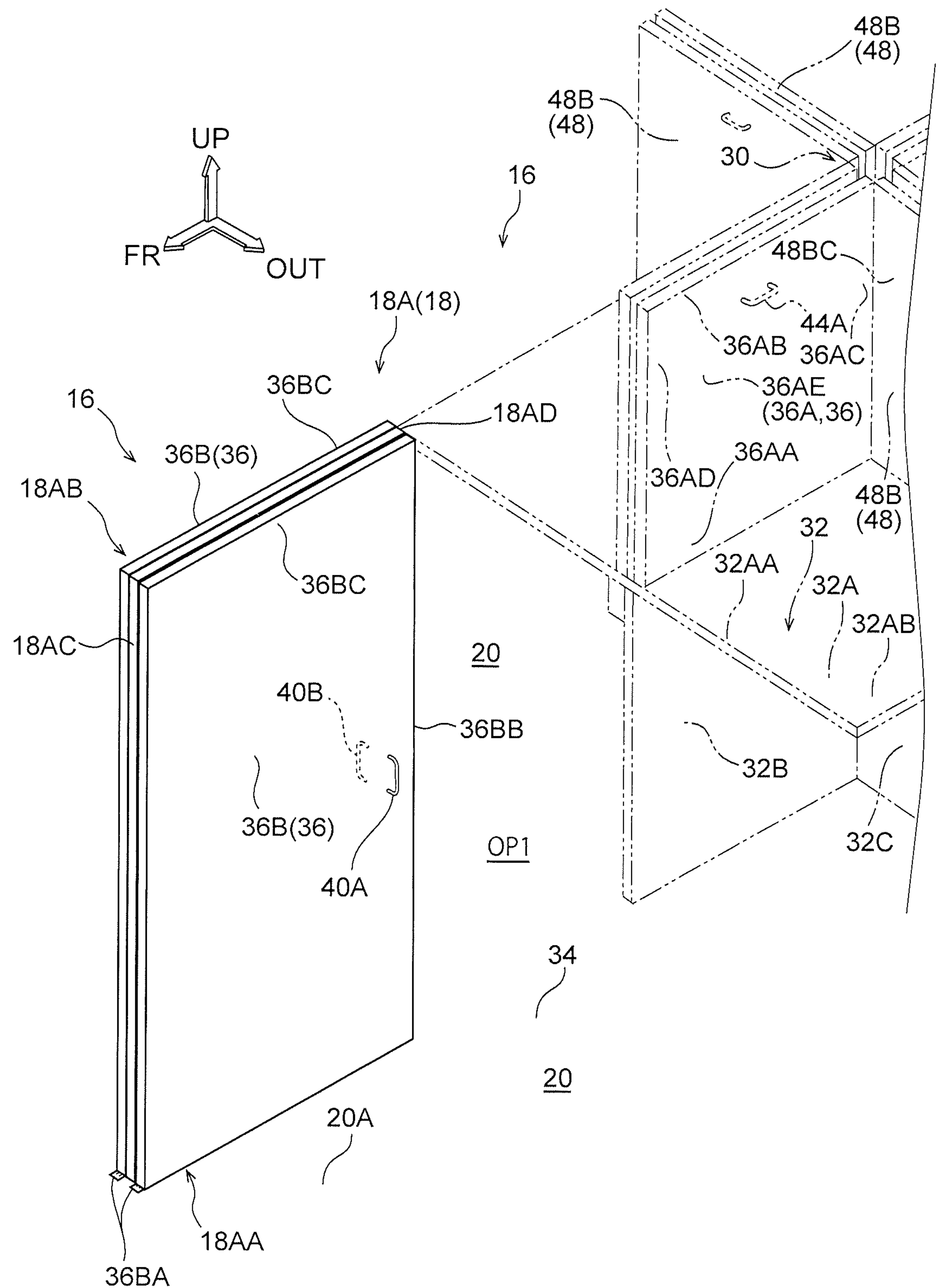
FIG. 6 is a schematic perspective view showing a state in which the horizontally movable walls are put into a connected state from the state shown in FIG. 4.

As shown in FIG. 6, when the opposing horizontally movable walls 36B are in the respective open states thereof, one of the individual spaces 20 and another of the individual spaces 20, which are adjacent with the horizontally movable walls 36B therebetween, are in communication and form a continuous space. This state corresponds to the "connected state".

Figure 9:
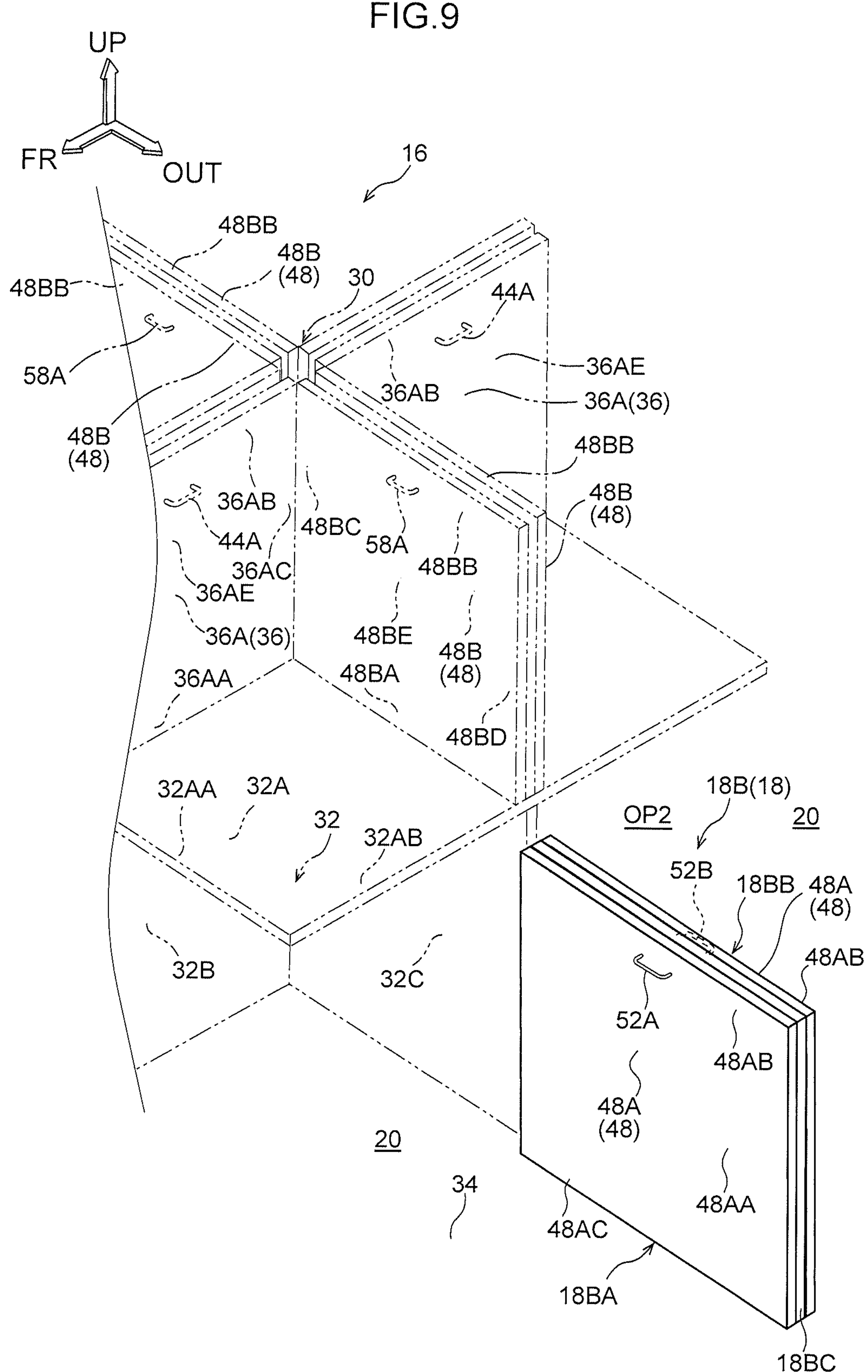
FIG. 9 is a schematic perspective view showing a state in which the vertically movable walls are put into the connected state from the state shown in FIG. 7.

Further, as shown in FIG. 9, when the opposing vertically movable walls 48A are in the respective open states thereof, one of the individual spaces 20 and another of the individual spaces 20, which are adjacent with the vertically movable walls 48A therebetween, are in communication and form a continuous space. This state also corresponds to the connected state.

As shown in FIG. 12, when the opposing first table movable walls 36A are in the respective open states thereof, one of the individual spaces 20 and another of the individual spaces 20, at the sides to which the first table movable walls 36A are tilted, are in communication and form a continuous space. This state also corresponds to the connected state.

As shown in FIG. 13, when the opposing second table movable walls 48B are in the respective open states thereof, one of the individual spaces 20 and another of the individual spaces 20, at the sides to which the second table movable walls 48B are tilted, are in communication and form a continuous space. This state also corresponds to the connected state.

—Partitioned State—

In contrast, as shown in FIG. 4, when the opposing horizontally movable walls 36B are in the respective closed states thereof and the opposing first table movable walls 36A are in the respective closed states thereof, the one individual space 20 and the another individual space 20 that sandwich the horizontally movable walls 36B and the first table movable walls 36A therebetween are partitioned and form non-continuous spaces. This state corresponds to the "partitioned state". As shown in FIG. 5, if at least one of the opposing horizontally movable walls 36B is in the closed state thereof, this also corresponds to the partitioned state. Similarly, if at least one of the opposing first table movable walls 36A is in the closed state thereof, this also corresponds to the partitioned state.

Further, as shown in FIG. 7, when the opposing vertically movable walls 48A are in the respective closed states thereof and the opposing second table movable walls 48B are in the respective closed states thereof, the one individual space 20 and the another individual space 20 that are adjacent sandwiching the vertically movable walls 48A and the second table movable walls 48B therebetween are partitioned and form non-continuous spaces. This state also corresponds to the partitioned state. As shown in FIG. 8, if at least one of the opposing vertically movable walls 48A is in the closed state thereof, this also corresponds to the partitioned state. Similarly, if at least one of the opposing second table movable walls 48B is in the closed state thereof, this also corresponds to the partitioned state.

Operation and Effects of the First Exemplary Embodiment

Now, operation and effects of the first exemplary embodiment are described.

According to the present exemplary embodiment as described above, as shown in FIG. 2, the wall portions 18 are provided in the passenger compartment 16 of the vehicle interior. The wall portions 18 may be selectively put into the partitioned state in which the passenger compartment 16 is partitioned into the plural individual spaces 20 and the connected state in which the individual spaces 20 are connected with one another. Therefore, when vehicle occupants want privacy protection, the wall portions 18 are put into the partitioned state and the vehicle occupants ride in the respectively separate individual spaces 20. Thus, privacy may be protected. On the other hand, when the vehicle occupants want to be able to communicate with one another, the wall portions 18 are put into the connected state. Thus, the vehicle occupants riding in the different individual spaces 20 may be able to communicate with one another easily.

In this passenger compartment, when an operation to put a wall portion 18 into the connected state is performed in each of neighboring individual spaces 20, the individual spaces 20 in which this operation is performed are put into the connected state with one another. That is, the wall portion 18 is put into the connected state by two vehicle occupants riding in the neighboring individual spaces 20 performing the operation to put the wall portion 18 into the connected state. Therefore, if only a vehicle occupant sitting in one of the individual spaces 20 performs the operation to put the wall portion 18 into the connected state, as shown in FIG. 5 and FIG. 8, the wall portion 18 does not go into the connected state unless a vehicle occupant riding in the another individual space 20 neighboring the one individual space 20 also performs the operation to put the wall portion 18 into the connected state. Therefore, in a situation in which either of the vehicle occupants does not want the connected state, a state in which the individual spaces 20 are connected with one another may be prevented. Thus, vehicle occupant privacy protection performance may be improved.

As shown in FIG. 5, the wall portions 18 include the two horizontally movable walls 36B that are opposingly provided between the neighboring individual spaces 20. The two horizontally movable walls 36B are put into the open states thereof only by operations in the individual spaces 20 at the respective opposite sides thereof, and as shown in FIG. 6, the neighboring individual spaces 20 are put into the connected state by the horizontally movable walls 36B each being put into the open state. That is, a vehicle occupant riding in the one individual space 20 may perform an operation to put only the one horizontally movable wall 36B facing the one individual space 20 into the open state, but cannot perform an operation to put the other horizontally movable wall 36B facing the another individual space 20, which neighbors the one individual space 20 with the horizontally movable walls 36B therebetween, into the open state. Therefore, if a vehicle occupant riding in the one individual space 20 puts the horizontally movable wall 36B at the side facing the one individual space 20 into the open state, the wall portion 18 does not go into the connected state unless a vehicle occupant riding in the another individual space 20 neighboring the one individual space 20 puts the other horizontally movable wall 36B facing the another individual space 20 into the open state. Therefore, in a situation in which either of the vehicle occupants does not want the connected state, a state in which the individual spaces 20 are connected with one another may be prevented with a simple structure. In the present embodiment, the two horizontally movable walls 36B are provided and have simple structures that may be moved and locked respectively separately. Thus, vehicle occupant privacy protection performance may be improved at low cost. Although the horizontally movable walls 36B are described above, the same applies to the vertically movable walls 48A, the first table movable wall 36A and the second table movable wall 48B as well as the horizontally movable walls 36.

Because each horizontally movable wall 36B is moved in the horizontal direction when being put into the open state thereof, a space for stowing the horizontally movable wall 36B can be provided at a separate location in the horizontal direction. That is, there is no need to provide space for stowing the horizontally movable wall 36B in a region OP1 that, as shown in FIG. 6, is opened up when the horizontally movable wall 36B is in the open state. Therefore, the region OP1 that is opened up may be specified to be a tall region in the vehicle vertical direction, spanning from the roof lining to the floor 34 of the passenger compartment 16. Hence, movement between the one individual space 20 and the another individual space 20 when in the connected state is easy. Thus, convenience for embarking and disembarking may be improved.

As shown in FIG. 9, because each vertically movable wall 48A is moved in the vertical direction when being put into the open state thereof, a space for stowing the vertically movable wall 48A can be provided at a separate location in the vertical direction. That is, space that is opened up when the vertically movable wall 48A is in the open state may be wider in the horizontal direction. Therefore, a sense of spaciousness when in the connected state may be enhanced. Thus, comfort in the connected state may be improved.

As shown in FIG. 6, because each horizontally movable wall 36B that moves in the horizontal direction is provided to divide the passenger compartment 16 in the vehicle width direction, the horizontally movable wall 36B moves in the vehicle front-and-rear direction in the passenger compartment 16, a dimension of which in the vehicle front-and-rear direction is ordinarily greater than a dimension in the vehicle width direction. Thus, it is easier to reserve stowing space for the horizontally movable wall 36B when the horizontally movable wall 36B is put into the open state.

As shown in FIG. 9, because each vertically movable wall 48A that moves in the vertical direction is provided to divide the passenger compartment in the vehicle front-and-rear direction, the vertically movable wall 48A moves in the vehicle vertical direction in the passenger compartment 16, the dimension of which in the vehicle width direction is ordinarily smaller than the dimension in the vehicle front-and-rear direction. Thus, it is easier to reserve stowing space for the vertically movable wall 48A when the vertically movable wall 48A is put into the open state. Therefore, layout flexibility of the passenger compartment interior may be improved.

Figure 11:
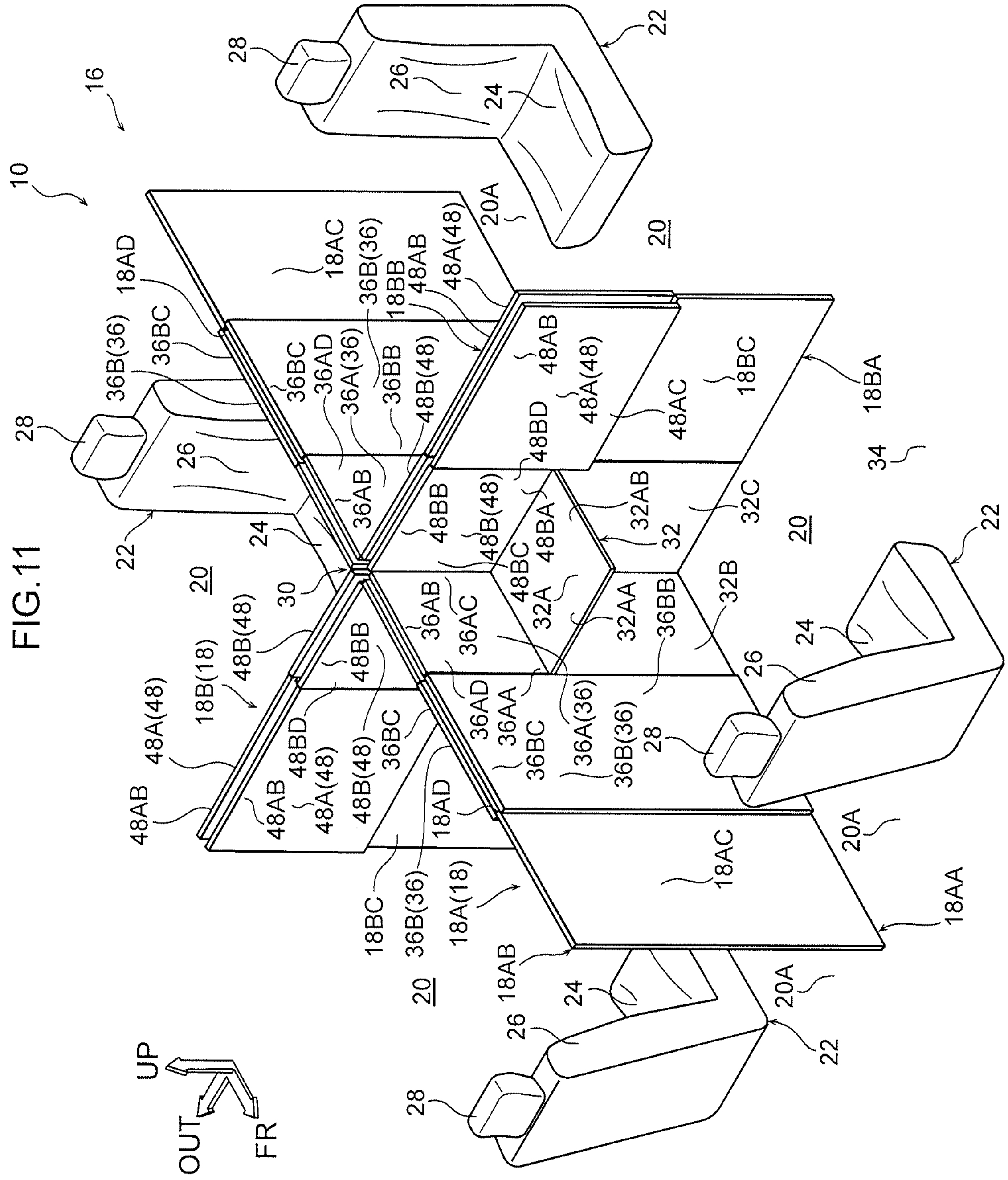
FIG. 11 is a schematic perspective view showing a state in which all wall portions of the passenger compartment structure according to the first exemplary embodiment are in the partitioned state.
Figure 14:
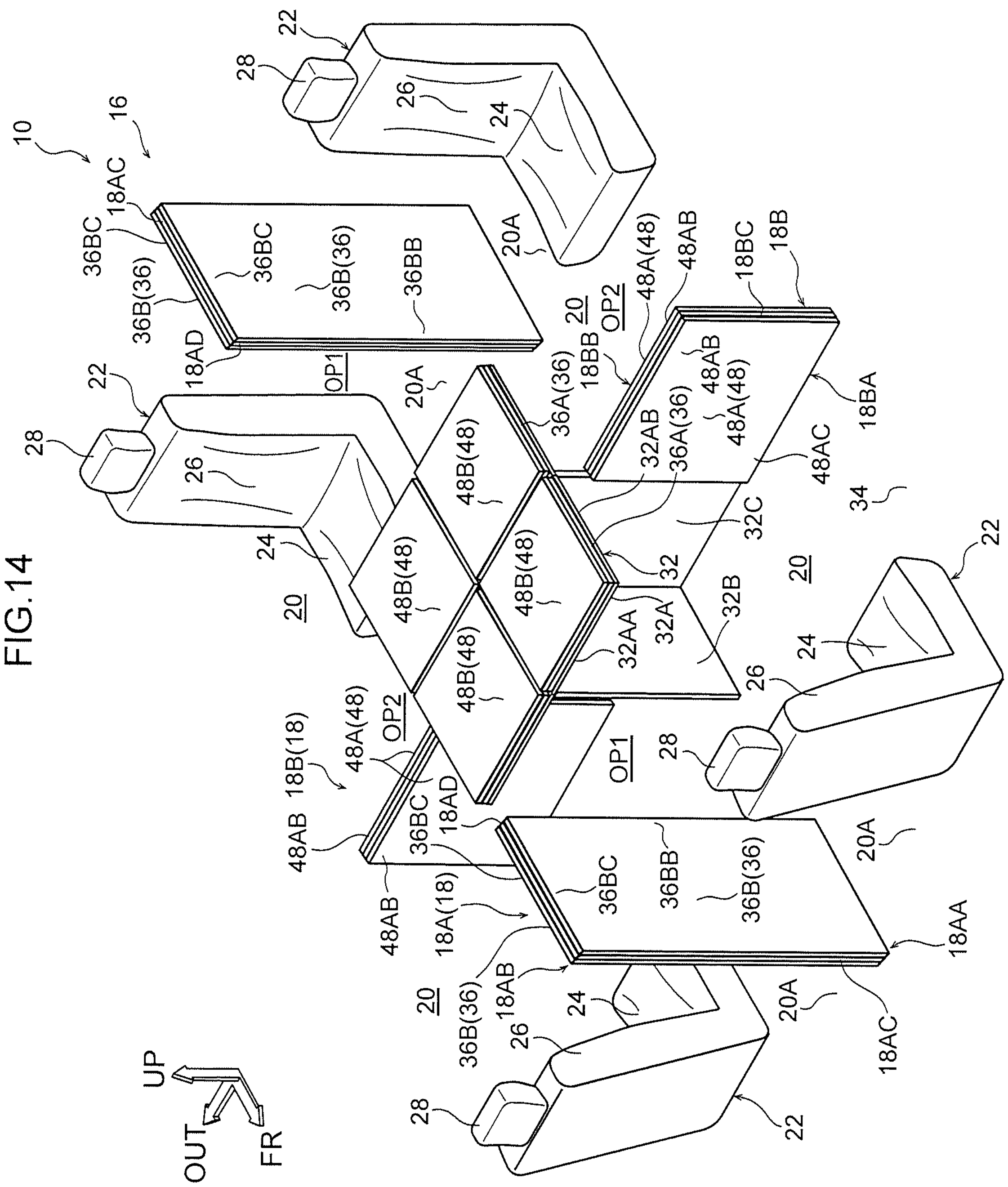
FIG. 14 is a schematic perspective view showing a state of the passenger compartment structure according to the first exemplary embodiment in which all the wall portions are in the connected state.

As shown in FIG. 3, the table 32 that straddles the neighboring individual spaces 20 is provided in the passenger compartment 16 and the wall portions 18, including the table 32, are selectively put into the partitioned state or the connected state. Therefore, in the partitioned state as shown in FIG. 11, vehicle occupants may use the table 32 individually, and in the connected state as shown in FIG. 12, FIG. 13 and FIG. 14, vehicle occupants may use a combined large area of the table 32 straddling the neighboring individual spaces 20. Thus, convenience during riding may be improved.

Because the table 32 is provided at the intersection portion 30 between the first wall portion 18A that divides the passenger compartment 16 in the vehicle front-and-rear direction and the second wall portion 18B that divides the passenger compartment 16 in the vehicle width direction, the table 32 may be efficiently provided at a number of the individual spaces 20. Thus, costs may be lowered.

The vehicle seats 22 are respectively provided in the plural individual spaces 20, and the respective vehicle seats 22 are disposed so as to face one another, sandwiching the second wall portion 18B that divides the passenger compartment 16 in the vehicle front-and-rear direction. Therefore, when the second wall portion 18B dividing the passenger compartment 16 in the vehicle front-and-rear direction is in the connected state as shown in FIG. 13 and FIG. 14, vehicle occupants are sitting in a state facing one another. Therefore, vehicle occupants wanting to be able to communicate with one another may be able to communicate easily even if the vehicle occupants are sitting separately from one another in the vehicle front-and-rear direction. Thus, communication between vehicle occupants in the connected state is easier.

As shown in FIG. 10, each first table movable wall 36A, when switching from the closed state to the open state, tilts toward the vehicle width direction outer side thereof over the top board 32A of the table 32. Each second table movable wall 48B, when switching from the closed state to the open state, tilts toward the vehicle front-and-rear direction outer side thereof over the top board 32A. That is, the first table movable wall 36A or second table movable wall 48B tilts toward the individual space 20 at the side at which the operation to put the first table movable wall 36A or second table movable wall 48B into the open state is performed. Therefore, the operation may be performed without checking the condition of the table 32 in the other individual space 20, such as whether an object is on the top board 32A in the other individual space 20. Thus, ease of operation may be improved.

The second hinge 56 is a structure that is attached to the second table movable wall 48B, but this is not limiting. The second hinge 56 may be provided at the first table movable wall 36A, or the second hinge 56 may be provided at both the first table movable wall 36A and the second table movable wall 48B.

As shown in FIG. 5, each horizontally movable wall 36B is a structure that is operated by gripping of the handle member 40A or 40B, but this is not limiting. A driving mechanism and an operating unit that activates the driving mechanism may be provided, the operating unit being disposed at an arbitrary location within the individual space 20 such as the floor 34, the roof lining, the wall portions 18 or the like, and the horizontally movable wall 36B may be moved by this operating unit being operated. As well as the horizontally movable walls 36B, driving mechanisms and operating units may be similarly provided at the vertically movable walls 48A, the first table movable walls 36A and the second table movable walls 48B (see FIG. 2).

Second Exemplary Embodiment

Now, a passenger compartment structure according to a second exemplary embodiment of the present disclosure is described using FIG. 16 to FIG. 19. Structural portions that are the same as in the first exemplary embodiment described above are assigned the same reference numerals, and descriptions thereof are not given.

Figure 17:
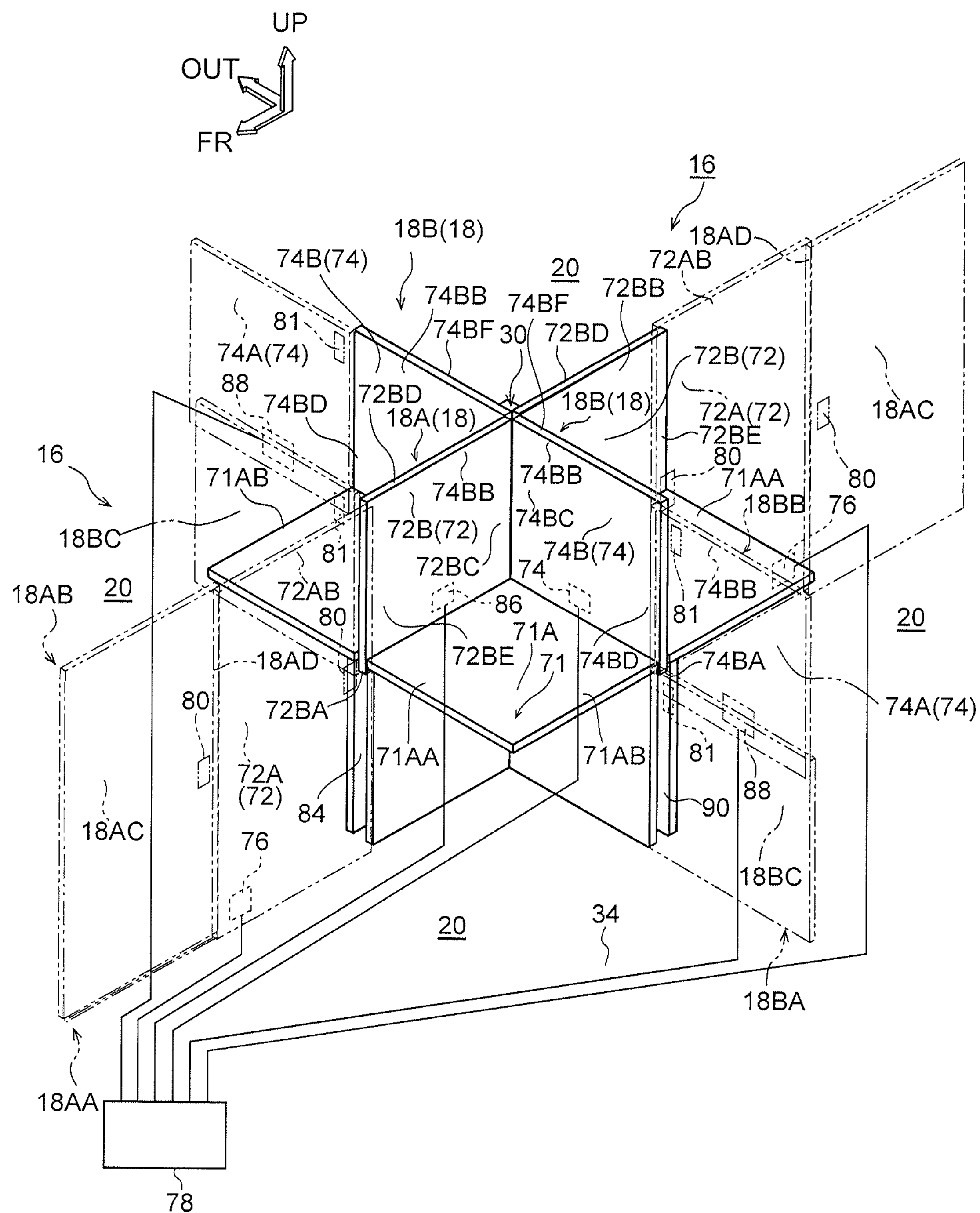
FIG. 17 is a schematic perspective view showing a state of the passenger compartment structure according to the second exemplary embodiment in which all wall portions are in the connected state.

A passenger compartment structure 70 according to the second exemplary embodiment has a basically similar structure to the first exemplary embodiment. As shown in FIG. 17, horizontally movable walls 72A, first table movable walls 72B, vertically movable walls 74A and second table movable walls 74B that form movable walls 72 and 74 provided at the wall portions 18 are structured by single board-shaped members.

—Movable Wall of the First Wall Portion—

Figure 16:
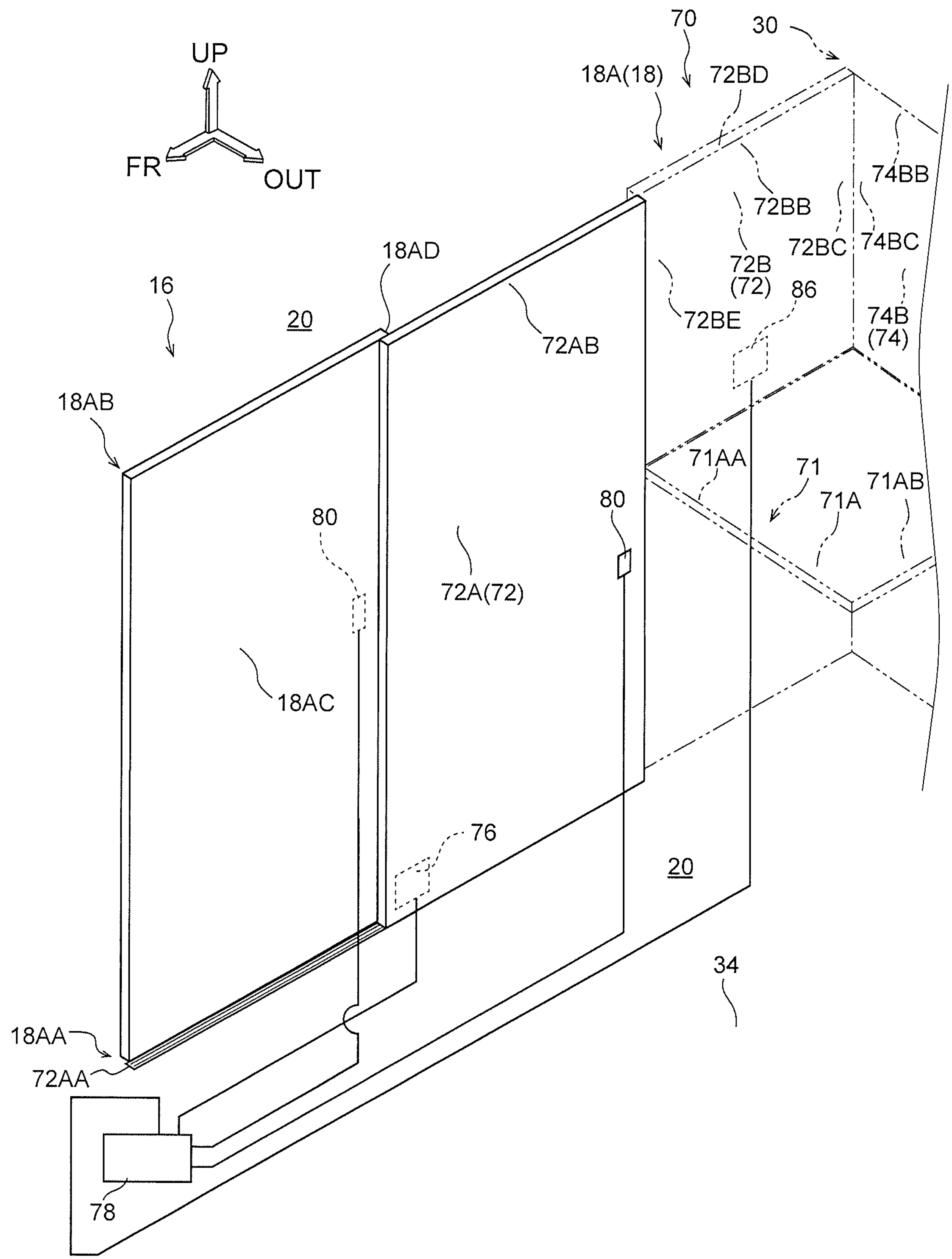
FIG. 16 is a schematic perspective view showing the partitioned state of a horizontally movable wall of a passenger compartment structure according to a second exemplary embodiment.

That is, as shown in FIG. 16, each horizontally movable wall 72A is provided between the fixed wall portion 18AC of the first wall portion 18A and a table 71. The horizontally movable wall 72A is formed of a board with a board thickness direction in the vehicle width direction. The horizontally movable wall 72A is provided at one side in the vehicle width direction relative to the fixed wall portion 18AC. The horizontally movable wall 72A is specified to be substantially the same size as the fixed wall portion 18AC, and is movable along a rail 72AA that extends in a horizontal direction, specifically the vehicle front-and-rear direction.

The horizontally movable wall 72A is movable along the rail 72AA when a driving mechanism 76 operates. The driving mechanism 76 includes a motor; the horizontally movable wall 72A is moved by rotation of this motor. When the driving mechanism 76 is in a stopped state, the horizontally movable wall 72A is locked and movement thereof along the rail 72AA is restricted. That is, a structure is formed in which manual movement of the horizontally movable wall 72A is difficult.

The driving mechanism 76 is electronically connected to a control device 78. The control device 78 is configured principally as a widely known computer equipped with a CPU, ROM, RAM and the like. An input side of the control device 78 is electronically connected to an opening/closing switch 80 that is provided at each of one of the individual spaces 20 and another of the individual spaces 20 opposing the horizontally movable wall 72A. An output side of the control device 78 is electronically connected to the driving mechanism 76. When both of the opening/closing switches 80 respectively provided in the one individual space 20 and the another individual space 20 opposing the horizontally movable wall 72A are operated to put the horizontally movable wall 72A into the open state thereof, in accordance with the inputs from both of the opening/closing switches 80, the control device 78 operates the driving mechanism 76 so as to put the horizontally movable wall 72A into the open state. That is, if only one of the opening/closing switches 80 respectively provided in the one individual space 20 and the another individual space 20 opposing the horizontally movable wall 72A is operated to put the horizontally movable wall 72A into the open state, the horizontally movable wall 72A does not go into the open state. The opening/closing switches 80 are attached to, for example, the horizontally movable wall 72A facing the one individual space 20 and the fixed wall portion 18AC facing the another individual space 20, but this is not limiting. The opening/closing switches 80 may be disposed at arbitrary locations within each of the individual spaces 20 as appropriate, such as the floor 34, the roof lining, the wall portions 18 or the like.

As shown in FIG. 17, each first table movable wall 72B structures another portion of the movable wall 72 and is formed of a single board member with a board thickness direction in the vehicle width direction. In the closed state of the first table movable wall 72B, a lower end portion 72BA of the first table movable wall 72B is disposed in an accommodating portion 84 formed in the table 71, and an upper end portion 72BB of the first table movable wall 72B is disposed at substantially the same height as an upper end portion 72AB of the horizontally movable wall 72A. An end portion 72BC at one side in the vehicle front-and-rear direction of the first table movable wall 72B is disposed substantially at the center in the vehicle front-and-rear direction of the table 71. An end portion 72BE at the other side in the vehicle front-and-rear direction of the first table movable wall 72B is disposed to correspond with an end portion 71AA of the table 71 in the vehicle front-and-rear direction.

Figure 18:
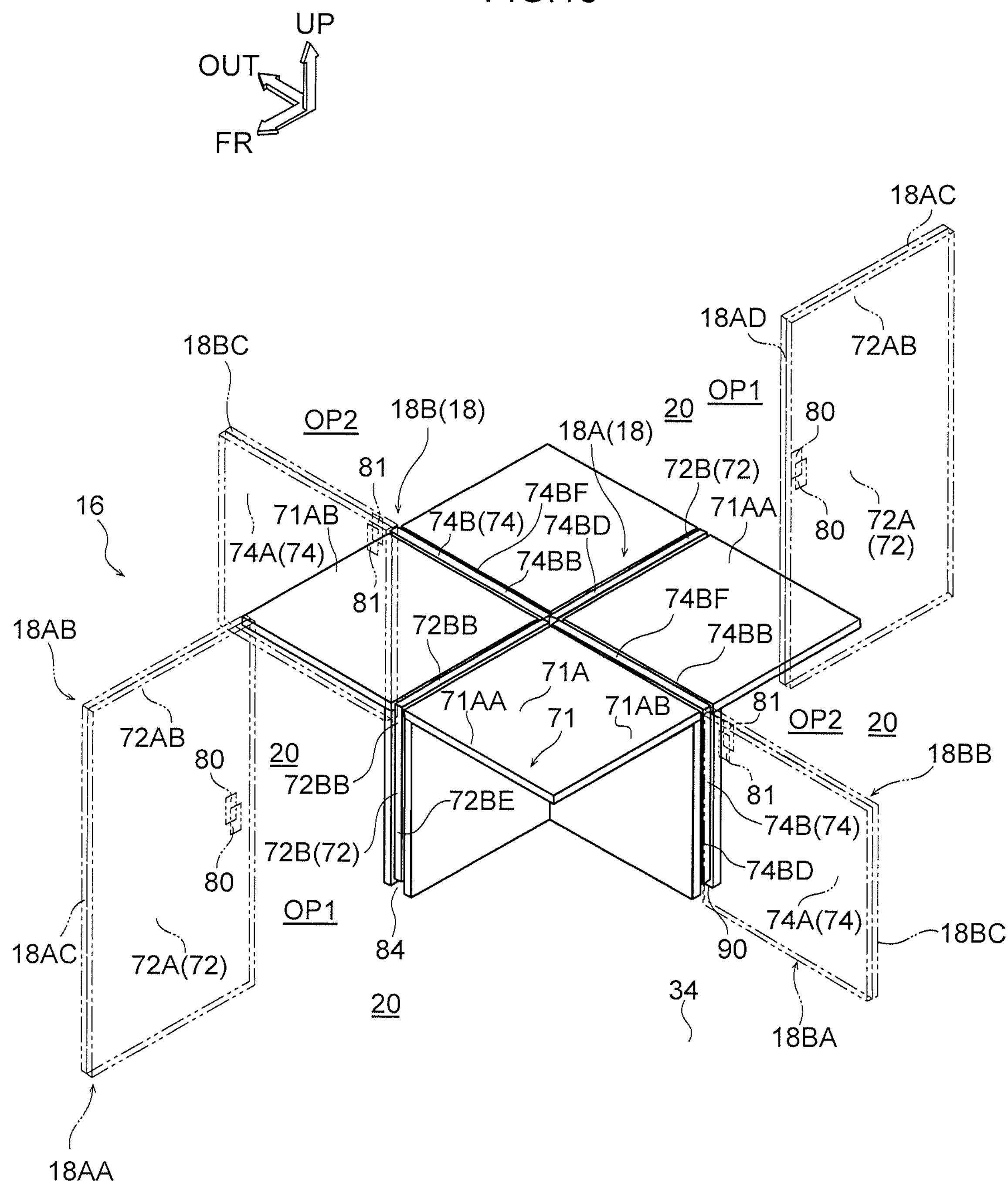
FIG. 18 is a schematic perspective view showing a state of the passenger compartment structure according to the second exemplary embodiment in which all the wall portions are in open states.

The first table movable wall 72B is movable in the vehicle vertical direction when a driving mechanism 86 operates. Similarly to the driving mechanism 76, the driving mechanism 86 includes a motor; the first table movable wall 72B is moved by rotation of this motor. When the first table movable wall 72B moves toward the vehicle lower side, as shown in FIG. 18, the first table movable wall 72B is accommodated in the accommodating portion 84 of the table 71 and an end face 72BD of the upper end portion 72BB (see FIG. 17) of the first table movable wall 72B is disposed to be substantially coplanar with the upper face of a top board 71A of the table 71. This corresponds to the "open state" of the first table movable wall 72B. When the driving mechanism 86 is in a stopped state, the first table movable wall 72B is locked and movement thereof in the vehicle vertical direction is restricted. That is, a structure is formed in which manual movement of the first table movable wall 72B is difficult.

The driving mechanism 86 is electronically connected to the output side of the control device 78. When both of the opening/closing switches 80 respectively provided in the one individual space 20 and the another individual space 20 opposing the horizontally movable wall 72A (see FIG. 16), as described above, are operated to put the first table movable wall 72B into the open state, in accordance with the inputs from both of the opening/closing switches 80, the control device 78 operates the driving mechanism 86 so as to put the first table movable wall 72B into the open state together with the horizontally movable wall 72A, as shown in FIG. 18. That is, if only one of the opening/closing switches 80 respectively provided in the one individual space 20 and the another individual space 20 opposing the horizontally movable wall 72A is operated to put the horizontally movable wall 72A into the open state, the first table movable wall 72B does not go into the open state.

—Movable Wall of the Second Wall Portion—

Figure 19:
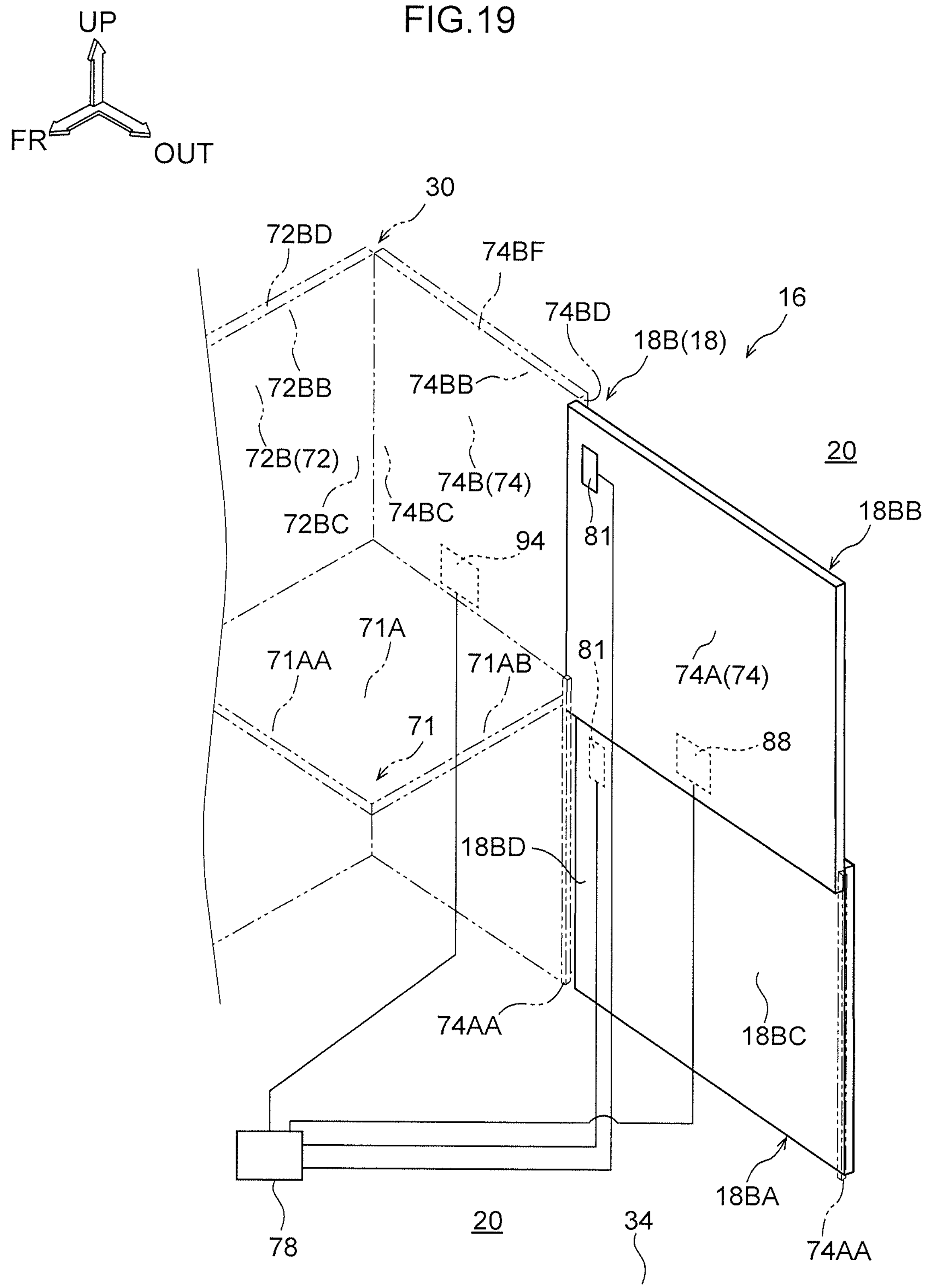
FIG. 19 is a schematic perspective view showing the partitioned state of a vertically movable wall of the passenger compartment structure according to the second exemplary embodiment.

As shown in FIG. 19, each vertically movable wall 74A is provided between the side doors 14 (see FIG. 3) and the table 71, and is formed of a board with a board thickness direction in the vehicle front-and-rear direction. The vertically movable wall 74A is provided at one side in the vehicle width direction relative to the fixed wall portion 18BC. The vertically movable wall 74A is specified to be substantially the same size as the fixed wall portion 18BC, and is attached to be movable along a rail 74AA that extends in a vertical direction, specifically the vehicle vertical direction.

The vertically movable wall 74A is movable along the rail 74AA in the vehicle vertical direction when a driving mechanism 88 operates. Similarly to the driving mechanism 76, the driving mechanism 88 includes a motor; the vertically movable wall 74A is moved by rotation of this motor. When the driving mechanism 88 is in a stopped state, the vertically movable wall 74A is locked and movement thereof in the vehicle vertical direction is restricted. That is, a structure is formed in which manual movement of the vertically movable wall 74A is difficult.

The driving mechanism 88 is electronically connected to the control device 78. The input side of the control device 78 is electronically connected to an opening/closing switch 81 that is provided in each of one of the individual spaces 20 and another of the individual spaces 20 opposing the vertically movable wall 74A. The output side of the control device 78 is electronically connected to the driving mechanism 88. When both of the opening/closing switches 81 respectively provided in the one individual space 20 and the another individual space 20 opposing the vertically movable wall 74A are operated to put the vertically movable wall 74A into the open state thereof, in accordance with the inputs from both of the opening/closing switches 81, the control device 78 operates the driving mechanism 88 so as to put the vertically movable wall 74A into the open state. That is, if only one of the opening/closing switches 81 respectively provided in the one individual space 20 and the another individual space 20 opposing the vertically movable wall 74A is operated to put the vertically movable wall 74A into the open state, the vertically movable wall 74A does not go into the open state. The opening/closing switches 81 are attached to, for example, the vertically movable wall 74A at the one individual space 20 and the fixed wall portion 18BC facing the another individual space 20, but this is not limiting. The opening/closing switches 81 may be disposed at arbitrary locations within each of the individual spaces 20 as appropriate, such as the floor 34, the roof lining, the wall portions 18 or the like.

As shown in FIG. 17, each second table movable wall 74B structures a portion of the movable wall 74 and is formed of a single board member with a board thickness direction in the vehicle front-and-rear direction. In the closed state of the second table movable wall 74B, a lower end portion 74BA of the second table movable wall 74B is disposed in an accommodating portion 90 formed in the table 71, and an upper end portion 74BB of the second table movable wall 74B is disposed at substantially the same height as the upper end portion 74BB of the vertically movable wall 74A in the closed state thereof. An end portion 74BC at one side in the vehicle width direction of the second table movable wall 74B is disposed substantially at the center in the vehicle width direction of the table 71. An end portion 74BD at the other side in the vehicle width direction of the second table movable wall 74B is disposed to correspond with an end portion 71AB at the vehicle width direction outer side of the table 71. In the closed state of the second table movable wall 74B, the end portion 74BC at the one side in the vehicle width direction abuts against the end portion 72BC at the one side in the vehicle front-and-rear direction of the first table movable wall 72B in the closed state thereof.

The second table movable wall 74B is movable in the vehicle vertical direction when a driving mechanism 94 operates. Similarly to the driving mechanism 76, the driving mechanism 94 includes a motor; the second table movable wall 74B is moved by rotation of this motor. When the second table movable wall 74B moves toward the vehicle lower side, as shown in FIG. 18, the second table movable wall 74B is accommodated in the accommodating portion 90 of the table 71 and an end face 74BF of the upper end portion 74BB (see FIG. 17) of the second table movable wall 74B is disposed to be substantially coplanar with the upper face of the top board 71A of the table 71. This corresponds to the "open state" of the second table movable wall 74B. When the driving mechanism 94 is in a stopped state, as shown in FIG. 17, the second table movable wall 74B is locked and movement thereof in the vehicle vertical direction is restricted. That is, a structure is formed in which manual movement of the second table movable wall 74B is difficult.

The driving mechanism 94 is electronically connected to the output side of the control device 78. When both of the opening/closing switches 81 respectively provided in the one individual space 20 and the another individual space 20 opposing the vertically movable wall 74A (see FIG. 19), as described above, are operated to put the vertically movable wall 74A into the open state, in accordance with the inputs from both of the opening/closing switches 81, the control device 78 operates the driving mechanism 94 so as to put the second table movable wall 74B into the open state together with the vertically movable wall 74A. That is, if only one of the opening/closing switches 81 respectively provided in the one individual space 20 and the another individual space 20 opposing the vertically movable wall 74A is operated to put the second table movable wall 74B into the open state, the second table movable wall 74B does not go into the open state.

—Connected State—

As shown in FIG. 18, when the horizontally movable wall 72A and the first table movable wall 72B are in the open states thereof, the one individual space 20 and the another individual space 20 that face the horizontally movable wall 72A and the first table movable wall 72B are in communication and form a continuous space. This state corresponds to the connected state. A state in which only one or the other of the horizontally movable wall 72A and the first table movable wall 72B is in the open state thereof also corresponds to the connected state.

When the vertically movable wall 74A and the second table movable wall 74B are in the open states thereof, the one individual space 20 and the another individual space 20 that face the vertically movable wall 74A and the second table movable wall 74B are in communication and form a continuous space. This state also corresponds to the connected state. A state in which only one or the other of the vertically movable wall 74A and the second table movable wall 74B is in the open state thereof also corresponds to the connected state.

—Partitioned State—

In contrast, as shown in FIG. 17, when the horizontally movable wall 72A is in the closed state thereof and the first table movable wall 72B is in the closed state thereof, the one individual space 20 and the another individual space 20 that face the horizontally movable wall 72A and the first table movable wall 72B are partitioned and form non-continuous spaces. This state corresponds to the "partitioned state".

When the vertically movable wall 74A is in the closed state thereof and the second table movable wall 74B is in the closed state thereof, the one individual space 20 and the another individual space 20 that face the vertically movable wall 74A and the second table movable wall 74B are partitioned and form non-continuous spaces. This state also corresponds to the partitioned state.

Operation and Effects of the Second Exemplary Embodiment

Now, operation and effects of the second exemplary embodiment are described.

According to the structure described above, this structure is similar to the passenger compartment structure 10 according to the first exemplary embodiment except in that the horizontally movable walls 72A, first table movable walls 72B, vertically movable walls 74A and second table movable walls 74B that structure the movable walls 72 and 74 provided at the wall portions 18 are formed of single board members. Therefore, the same effects as in the first exemplary embodiment are provided. In addition, as shown in FIG. 16, the wall portions 18 include the single horizontally movable walls 72A that are each provided between neighboring individual spaces 20. Each horizontally movable wall 72A goes into the open state only when operations to put the horizontally movable wall 72A into the open state are performed in each of the one individual space 20 and the another individual space 20 opposing the horizontally movable wall 72A. That is, even if a vehicle occupant riding in one of the individual spaces 20 operates the opening/closing switch 80 or 81 to put the horizontally movable wall 72A into the open state, the horizontally movable wall 72A does not go into the open state—and the one individual space 20 and another individual space 20 neighboring the one individual space 20 with the horizontally movable wall 72A therebetween do not go into the connected state—unless a vehicle occupant riding in the another individual space 20 operates the opening/closing switch 80 or 81 therein to put the horizontally movable wall 72A into the open state. Thus, while space may be saved with the single horizontally movable wall 72A, in a situation in which either of the vehicle occupants does not want the connected state, a state in which the individual spaces 20 are connected with one another may be prevented. Therefore, both efficient use of space may be improved and vehicle occupant privacy protection performance may be improved. Moreover, although the horizontally movable walls 72A are described above, the same applies to the vertically movable walls 74A, the first table movable walls 72B and the second table movable walls 74B (see FIG. 17) as well as the horizontally movable walls 72A.

The present exemplary embodiment is configured such that when the horizontally movable wall 72A goes into the open state thereof, the first table movable wall 72B goes into the open state thereof together with the horizontally movable wall 72A, and when the horizontally movable wall 72A goes into the closed state thereof, the first table movable wall 72B goes into the closed state thereof together with the horizontally movable wall 72A. However, this is not limiting. The horizontally movable wall 72A and the first table movable wall 72B may be put into the open states and closed states thereof respectively independently. Similarly, when the vertically movable wall 74A goes into the open state thereof, the second table movable wall 74B goes into the open state thereof together with the vertically movable wall 74A, and when the vertically movable wall 74A goes into the closed state thereof, the second table movable wall 74B goes into the closed state thereof together with the vertically movable wall 74A. However, this is not limiting. The vertically movable wall 74A and the second table movable wall 74B may be put into the open states and closed states thereof respectively independently.

In the first exemplary embodiment and second exemplary embodiment described above, as shown in FIG. 11 and FIG. 17, the horizontally movable walls 36B or 72A are provided at the first wall portion 18A, and the vertically movable walls 48A or 74A are provided at the second wall portion 18B, but this is not limiting. Only the horizontally movable walls 36B or 72A may be provided at both the first wall portion 18A and the second wall portion 18B, or only the vertically movable walls 48A or 74A may be provided at both the first wall portion 18A and the second wall portion 18B. Alternatively, both the horizontally movable walls 36B or 72A and the vertically movable walls 48A or 74A may be provided at the first wall portion 18A, and both the horizontally movable walls 36B or 72A and the vertically movable walls 48A or 74A may be provided at the second wall portion 18B.

The passenger compartment 16 is divided into the four individual spaces 20 by the first wall portion 18A and the second wall portion 18B, but this is not limiting. The passenger compartment 16 may be divided into five or more of the individual spaces 20. The first wall portion 18A and second wall portion 18B of the wall portions 18 intersect at a substantially central portion of the passenger compartment 16, but this is not limiting. The first wall portion 18A and second wall portion 18B may intersect at a location other than the substantially central portion of the passenger compartment 16, or the passenger compartment 16 may include and be partitioned by only one of the first wall portion 18A and the second wall portion 18B. Further, the first wall portion 18A and the second wall portion 18B extend in the vehicle front-and-rear direction and the vehicle width direction, but this is not limiting. Wall portions may extend in diagonal directions in a vehicle plan view.

The table 32 or 71 is provided at the intersection portion 30 of the first wall portion 18A and the second wall portion 18B, but this is not limiting. A table may be provided at an alternative location.

As shown in FIG. 2, the vehicle seats 22 are configured to face one another with the second wall portion 18B therebetween, but this is not limiting. All of the vehicle seats 22 may face in the same direction, or the vehicle seats 22 may be disposed in respectively different orientations.

As shown in FIG. 1, the vehicle 12 is configured as a self-driving vehicle, but this is not limiting. The vehicle 12 may be an ordinary vehicle in which a vehicle occupant conducts driving. In this case, the wall portions 18 may be provided at locations of the passenger compartment 16 excluding a driver seat, or the wall portions 18 may be provided at locations of the passenger compartment 16 including the driver seat.

As shown in FIG. 2, the horizontally movable wall 36B and first table movable wall 36A of each movable wall 36 are structured as respectively separate bodies, but this is not limiting. For example, a portion of the horizontally movable wall 36B may extend above the table 32 and this extending portion may serve as the first table movable wall 36A. According to an alternative structure, the horizontally movable wall 36B and the first table movable wall 36A may be integrated. Similarly, the horizontally movable wall 72A and first table movable wall 72B (see FIG. 17), and the vertically movable wall 48A (see FIG. 2) or vertically movable wall 74A (see FIG. 17) and the second table movable wall 48B (see FIG. 2) or second table movable wall 74B (see FIG. 17) may each be formed as integrated structures.

Excluding the first table movable wall 36A, the lower end portion 18AA of the first wall portion 18A substantially abuts against the floor 34 of the passenger compartment 16, and the upper end portion 18AB substantially abuts against the roof lining of the passenger compartment 16. Similarly, excluding the second table movable wall 48B, the upper end portion 18AB of the second wall portion 18B substantially abuts against the floor 34 of the passenger compartment 16, and the upper end portion 18BB substantially abuts against the roof lining of the passenger compartment 16. Thus, the respective individual spaces 20 that are put into the partitioned state by the first wall portion 18A and the second wall portion 18B are substantially in completely partitioned states. However, this is not limiting. For example, the first wall portion 18A and second wall portion 18B may be provided only in ranges corresponding to substantially the same heights as face areas of vehicle occupants riding in the vehicle seats 22, only blocking lines of sight. Alternatively, the first wall portion 18A and second wall portion 18B may be provided only partially and the individual spaces 20 may include spaces that are in partial communication with one another.

As shown in FIG. 4, the movable wall 36 includes the two opposing horizontally movable walls 36B, but this is not limiting. The movable wall 36 may have a three-layer structure in which a separate wall portion formed of a transparent material is provided between the two opposing horizontally movable walls 36B, or may have a structure provided with an even greater number of layers. Similarly, the first table movable wall 36A, the vertically movable wall 48A and the second table movable wall 48B (see FIG. 2) may have three-layer structures in which a separate wall member formed of a transparent material is sandwiched, and may have structures that are provided with even greater numbers of layers.

Hereabove, exemplary embodiments of the present disclosure have been described. The present disclosure is not limited by these descriptions, and numerous modifications outside of these descriptions may be embodied within a technical scope not departing from the spirit of the disclosure.

The passenger compartment structure according to the present exemplary embodiment described above may be considered from a different perspective. For example, the problem to be solved (object) of the passenger compartment structure according to the present exemplary embodiments may be understood as "to both assure individual spaces at a table provided in a passenger compartment and assure large spaces."

When the object is understood as described above, an aspect of the present disclosure is, for example, as follows.

"A passenger compartment structure comprising:

a passenger compartment that serves as an accommodation space for vehicle occupants;

a table provided in the passenger compartment; and a table movable wall that is provided at the table, is capable of selectively being put into a partitioned state and a connected state, a space over a top board of the table being partitioned into a plurality of individual spaces in the partitioned state, at least a neighboring pair of the individual spaces being connected with one another in the connected state, and when an operation to put neighboring the individual spaces into the connected state is performed at each of the neighboring individual spaces, the table movable wall putting the neighboring individual spaces in which the operation has been performed into the connected state."

According to the structure described above, the table is provided in the passenger compartment that serves as an accommodation space for vehicle occupants. The table movable wall is provided at the table and may be selectively put into the partitioned state in which the table movable wall partitions the space over the top board into the plural individual spaces or the connected state in which at least one pair of neighboring individual spaces are connected with one another. Thus, by putting the table movable wall into the partitioned state, a vehicle occupant may assure an individual space over the table that may be individually used when another person has boarded the vehicle, but by putting the table movable wall into the connected state, a vehicle occupant may remove the partition of the table and use a large area when an acquaintance has boarded the vehicle.

When an operation to put the table movable wall into the connected state is performed at each of neighboring individual spaces, the individual spaces at which this operation is performed are put into the connected state with one another. That is, the table movable wall is put into the connected state by two vehicle occupants who are using the neighboring individual spaces performing the operation to put the table movable wall into the connected state. Therefore, if only a vehicle occupant using one individual space performs the operation to put the table movable wall into the connected state, the table movable wall does not go into the connected state unless a vehicle occupant using another individual space neighboring the one individual space also performs the operation to put the table movable wall into the connected state. Therefore, in a situation in which either of the vehicle occupants does not want the connected state, a state in which the individual spaces of the table are connected with one another may be prevented.

An object of the present disclosure is to provide a passenger compartment structure that may improve vehicle occupant privacy protection performance.

A first aspect of the present disclosure is a passenger compartment structure that includes: a passenger compartment that serves as an accommodation space for vehicle occupants; and a wall portion that is capable of selectively being put into a partitioned state and a connected state, the passenger compartment being partitioned into a plurality of individual spaces in the partitioned state, at least a neighboring pair of the individual spaces being connected with one another in the connected state, and in a case in which an operation to put neighboring individual spaces into the connected state is performed in each of the neighboring individual spaces, the wall portion putting the neighboring individual spaces in which the operation has been performed into the connected state.

According to the first aspect, the wall portion is provided in the passenger compartment that serves as an accommodation space for vehicle occupants. The wall portion may be selectively put into the partitioned state that partitions the passenger compartment into plural individual spaces and the connected state in which at least one pair of neighboring individual spaces are connected with one another. Accordingly, when vehicle occupants want privacy protection, the wall portion is put into the partitioned state and the vehicle occupants ride in respectively separate individual spaces. Thus, privacy may be protected. On the other hand, when vehicle occupants want to be able to communicate with one another, the wall portion is put into the connected state. Thus, the vehicle occupants riding in different individual spaces may be able to communicate with one another easily.

In the present disclosure, when an operation to put the wall portion into the connected state is performed in each of neighboring individual spaces, the individual spaces in which this operation is performed are put into the connected state with one another. That is, the wall portion is put into the connected state by two vehicle occupants riding in the neighboring individual spaces both performing the operation to go into the connected state. Therefore, if only a vehicle occupant sitting in one individual space performs the operation to go into the connected state, the wall portion is not put into the connected state unless a vehicle occupant riding in another individual space neighboring the one individual space also performs the operation to go into the connected state. Therefore, in a situation in which either of the vehicle occupants does not want the connected state, a state in which the individual spaces are connected with one another may be prevented.

The meaning of the term "partition" as used herein includes respective individual spaces being demarcated (divided) in a state in which there is substantially no aperture therebetween, being demarcated (divided) with an aperture but with lines of sight being blocked, and so forth.

A second aspect of the present disclosure is the first aspect of the passenger compartment structure, wherein: the wall portion includes two movable walls that are opposingly provided between neighboring individual spaces, and that are in the connected state in a case in which both movable walls are in open states; and each of the movable walls is put into the open state thereof only by the operation being performed in an individual space that is at a side opposing the respective movable wall.

According to the second aspect, the wall portion includes the two movable walls that are opposingly provided between the neighboring individual spaces. The two movable walls are put into the open states thereof only by operations in the individual spaces at the respective opposing sides, and the neighboring individual spaces are put into the connected state by the movable walls both being put into the open states. That is, a vehicle occupant riding in one individual space may perform an operation to put only the one movable wall facing the one individual space into the open state, but cannot perform an operation to put the other movable wall facing the other individual space, which neighbors the one individual space with the movable walls therebetween, into the open state thereof. Therefore, if a vehicle occupant riding in the one individual space puts the movable wall at the side facing the one individual space into the open state, the wall portion does not go into the connected state unless a vehicle occupant riding in the other individual space neighboring the one individual space puts the other movable wall facing the other individual space into the open state. Thus, in a situation in which either of the vehicle occupants does not want the connected state, a state in which the individual spaces are connected with one another may be prevented with a simple structure.

A third aspect of the present disclosure is the first or the second aspect of the passenger compartment structure, wherein: the wall portion includes a single movable wall that is provided between neighboring individual spaces, and that is in the connected state in a case in which the movable wall is in an open state; and the movable wall is put into the open state by an operation to put the movable wall into the open state being performed both in an individual space that is at one side opposing the movable wall and in an individual space that is at the other side opposing the movable wall.

According to the third aspect, the wall portion includes the single movable wall provided between the neighboring individual spaces. This movable wall is put into the open state only by operations to put the movable wall into the open state being performed from both one individual space and another individual space opposing the movable wall. That is, if a vehicle occupant riding in the one individual space performs the operation to put the movable wall into the open state, the movable wall does not go into the open state—and the one individual space and another individual space are not put into the connected state—unless a vehicle occupant riding in the another individual space, which neighbors the one individual space with the movable wall therebetween, also performs the operation to put the movable wall into the open state. Therefore, while space may be saved with the single movable wall, in a situation in which either of the vehicle occupants does not want the connected state, a state in which the individual spaces are connected with one another may be prevented.

A fourth aspect of the present disclosure is the second or the third aspect of the passenger compartment structure, wherein the movable wall goes into the open state by moving in a horizontal direction.

According to the fourth aspect, because the movable wall is moved in the horizontal direction when being put into the open state, a space for stowing the movable wall can be provided at a separate location in the horizontal direction. That is, there is no need to provide space for stowing the movable wall in a region that is opened up when the movable wall is in the open state. Therefore, the region that is opened up may be specified to be a tall region in a vehicle vertical direction, spanning from a ceiling to a floor of the passenger compartment. Hence, movement between one individual space and another individual space when in the connected state is easy.

A fifth aspect of the present disclosure is the second or the third aspect of the passenger compartment structure, wherein the movable wall goes into the open state by moving in a vertical direction.

According to the fifth aspect, because the movable wall is moved in the vertical direction when being put into the open state, a space for stowing the movable wall can be provided at a separate location in the vertical direction. That is, a space that is opened up when the movable wall is in the open state may be wider in the horizontal direction. Therefore, a sense of spaciousness when in the connected state may be enhanced.

A sixth aspect of the present disclosure is the fourth aspect of the passenger compartment structure, wherein the movable wall is provided so as to divide the passenger compartment in a vehicle width direction.

According to the sixth aspect, because the movable wall that moves in the horizontal direction is provided to divide the passenger compartment in the vehicle width direction, the movable wall moves in the vehicle front-and-rear direction in the passenger compartment, a dimension of which in the vehicle front-and-rear direction is ordinarily greater than a dimension in the vehicle width direction. Thus, it is easier to reserve a stowing space for the movable wall when the movable wall is put into the open state.

A seventh aspect of the present disclosure is the fifth aspect of the passenger compartment structure, wherein the movable wall is provided so as to divide the passenger compartment in a vehicle front-and-rear direction.

According to the seventh aspect, because the movable wall that moves in the vertical direction is provided to divide the passenger compartment in the vehicle front-and-rear direction, the movable wall moves in the vehicle vertical direction in the passenger compartment, the dimension of which in the vehicle width direction is ordinarily smaller than the dimension in the vehicle front-and-rear direction.

Thus, it is easier to reserve a stowing space for the movable wall when the movable wall is put into the open state.

An eighth aspect of the present disclosure is any of the first to the seventh aspects of the passenger compartment structure, wherein: a table that straddles neighboring individual spaces is provided in the passenger compartment; and the partitioned state and the connected state into which the wall portion is selectively put include partition and connection of the table.

According to the eighth aspect, the table that straddles the neighboring individual spaces is provided and the wall portion, including the table, is selectively put into the partitioned state or the connected state. Hence, in the partitioned state, vehicle occupants may use the table individually, and in the connected state, vehicle occupants may use a combined large area of the table straddling the neighboring individual spaces.

A ninth aspect of the present disclosure is the eighth aspect of the passenger compartment structure, wherein the table is provided at an intersection portion between one wall portion that divides the passenger compartment in a vehicle front-and-rear direction and another wall portion that divides the passenger compartment in a vehicle width direction.

According to the ninth aspect, because the table is provided at the intersection portion between the wall portion that divides the passenger compartment in the vehicle front-and-rear direction and the wall portion that divides the passenger compartment in the vehicle width direction, the table may be efficiently provided at plural individual spaces.

A tenth aspect of the present disclosure is any of the first to the ninth aspects of the passenger compartment structure, wherein a vehicle seat is provided in each of the plurality of individual spaces, the wall portion divides the passenger compartment in a vehicle front-and-rear direction, and the plurality of vehicle seats are disposed so as to face one another with the wall portion therebetween.

According to the tenth aspect, the respective vehicle seats are provided in the plural individual spaces, and the respective vehicle seats are disposed so as to face one another, sandwiching the wall portion that divides the passenger compartment in the vehicle front-and-rear direction. Therefore, when the wall portion dividing the passenger compartment in the vehicle front-and-rear direction is in the connected state, vehicle occupants are sitting in a state facing one another. Therefore, vehicle occupants wanting to be able to communicate with one another may be able to communicate easily even if the vehicle occupants are sitting separately from one another in the vehicle front-and-rear direction.

A passenger compartment structure according to the first aspect may improve vehicle occupant privacy protection performance.

A passenger compartment structure according to the second aspect may improve vehicle occupant privacy protection performance at low cost.

A passenger compartment structure according to the third aspect may both improve space usage efficiency and improve vehicle occupant privacy protection performance.

A passenger compartment structure according to the fourth aspect may improve convenience for embarking and disembarking.

A passenger compartment structure according to the fifth aspect may improve comfort in the connected state.

Passenger compartment structures according to the sixth aspect and the seventh aspect may improve layout flexibility within the passenger compartment.

A passenger compartment structure according to the eighth aspect may improve convenience during riding.

A passenger compartment structure according to the ninth aspect may reduce costs.

A passenger compartment structure according to the tenth aspect may make communication between vehicle occupants in the connected state easier.

What is claimed is:

1. A passenger compartment structure comprising:

a passenger compartment that serves as an accommodation space for vehicle occupants; and a wall portion that is capable of selectively being put into a partitioned state and a connected state, the passenger compartment being partitioned into a plurality of individual spaces in the partitioned state, at least a neighboring pair of the individual spaces being connected with one another in the connected state, and in a case in which an operation that puts neighboring individual spaces into the connected state is performed in each of the neighboring individual spaces, the wall portion putting the neighboring individual spaces in which the operation has been performed into the connected state, wherein the wall portion includes a single movable wall that is provided between a first individual space and a second individual space, and that is in the connected state in a case in which the single movable wall is in an open state, and wherein the single movable wall is put into the open state only when both a first switch that is configured to put the single movable wall into the open state and that can be operated only from the first individual space, and a second switch that is configured to put a movable wall that is identical to the single movable wall into the open state and that can be operated only from the second individual space, are operated.

2. The passenger compartment structure according to claim 1, wherein the movable wall goes into the open state by moving in a horizontal direction.

3. The passenger compartment structure according to claim 1, wherein the movable wall goes into the open state by moving in a vertical direction.

4. The passenger compartment structure according to claim 2, wherein the movable wall is provided so as to divide the passenger compartment in a vehicle width direction.

5. The passenger compartment structure according to claim 3, wherein the movable wall is provided so as to divide the passenger compartment in a vehicle front-and-rear direction.

6. The passenger compartment structure according to claim 1, wherein a table that straddles neighboring individual spaces is provided in the passenger compartment, and wherein the partition state of the wall portion puts the table into a partition state and the connected state of the wall portion puts the table into a connected state.

7. The passenger compartment structure according to claim 6, wherein the table is provided at an intersection portion between a first wall portion that divides the passenger compartment in a vehicle front-and-rear direction and a second wall portion that divides the passenger compartment in a vehicle width direction.

8. The passenger compartment structure according to claim 6, wherein a first table movable wall and a second table movable wall facing the first table movable wall are provided on the table, wherein a closed state of the first table movable wall and the second table movable wall is a state in which the first table movable wall and the second table movable wall are upright on a top board of the table, and wherein an open state of the first table movable wall and the second table movable wall is a state in which the first table movable wall tilts over the top board toward an opposite side of the second table movable wall and the second table movable wall tilts over the top board toward an opposite side of the first table movable wall.

9. The passenger compartment structure according to claim 1, wherein the wall portion includes a handle member equipped with a locking mechanism, locking thereof being unlocked in a case in which the handle member is gripped.

10. The passenger compartment structure according to claim 1, wherein a vehicle seat is provided in each of the plurality of individual spaces, the wall portion divides the passenger compartment in a vehicle front-and-rear direction, and the plurality of vehicle seats are disposed so as to face one another with the wall portion therebetween.

* * * * *